US008948586B2

(12) United States Patent
Zhang et al.

(10) Patent No.: US 8,948,586 B2
(45) Date of Patent: Feb. 3, 2015

(54) METHOD AND APPARATUS FOR LASER OVERLAP DETECTION

(75) Inventors: Dongsheng Zhang, Fremont, CA (US); Eugene W. Lee, San Jose, CA (US); Wei Yao, Shanghai (CN)

(73) Assignee: Cortina Access, Inc., Sunnyvale, CA (US)

( * ) Notice: Subject to any disclaimer, the term of this patent is extended or adjusted under 35 U.S.C. 154(b) by 147 days.

(21) Appl. No.: 13/327,418

(22) Filed: Dec. 15, 2011

(65) Prior Publication Data

US 2013/0156423 A1 Jun. 20, 2013

(51) Int. Cl.
*H04B 10/08* (2006.01)

(52) U.S. Cl.
USPC ................................. 398/9; 398/33

(58) Field of Classification Search
CPC .................. H04J 2203/006; H04Q 2011/0083
USPC ..................................... 398/68, 35
See application file for complete search history.

(56) References Cited

U.S. PATENT DOCUMENTS

| | | | |
|---|---|---|---|
| 7,787,777 B2 * | 8/2010 | Iio et al. ........................ | 398/180 |
| 7,840,135 B2 * | 11/2010 | Zhao et al. ...................... | 398/33 |
| 7,881,613 B2 * | 2/2011 | Kim et al. ....................... | 398/71 |
| 8,064,764 B2 * | 11/2011 | O'Byrne et al. ................. | 398/25 |
| 2004/0086277 A1 | 5/2004 | Kenny | |
| 2004/0109688 A1 * | 6/2004 | Kim et al. ....................... | 398/68 |
| 2006/0093356 A1 * | 5/2006 | Vereen et al. ................... | 398/33 |
| 2006/0268759 A1 * | 11/2006 | Emery et al. ................... | 370/321 |
| 2007/0133596 A1 | 6/2007 | Kim | |
| 2007/0230958 A1 * | 10/2007 | Jiang et al. ..................... | 398/72 |
| 2007/0274719 A1 * | 11/2007 | Ferguson et al. ............... | 398/66 |
| 2008/0019690 A1 * | 1/2008 | Zhao et al. ..................... | 398/17 |
| 2009/0110403 A1 * | 4/2009 | Kramer .......................... | 398/98 |
| 2009/0263127 A1 * | 10/2009 | Haran et al. .................... | 398/38 |
| 2010/0054759 A1 | 3/2010 | Oda et al. | |
| 2010/0111523 A1 | 5/2010 | Hirth et al. | |
| 2010/0239252 A1 | 9/2010 | Davis et al. | |
| 2010/0254706 A1 | 10/2010 | Hirth et al. | |
| 2011/0087925 A1 * | 4/2011 | Haran ............................. | 714/37 |
| 2011/0123193 A1 * | 5/2011 | Yamanaka et al. ............. | 398/45 |
| 2011/0142444 A1 * | 6/2011 | Borges et al. .................. | 398/25 |

(Continued)

OTHER PUBLICATIONS

IEEE Std. 802.3-2008, "Multipoint MAC Control", CSMA/CD, pp. 245-298.

(Continued)

*Primary Examiner* — Ken Vanderpuye
*Assistant Examiner* — Amritbir Sandhu
(74) *Attorney, Agent, or Firm* — Amin, Turocy & Watson, LLP

(57) ABSTRACT

There are disclosed systems and methods for detecting whether an Optical Network Unit (ONU) in a network may be causing a communications interference due to laser overlap. In one embodiment, an Optical Line Terminal (OLT) selects a pair of ONUs suspected of possibly causing laser overlap. The OLT then grants a first window to a first ONU for transmitting a first message, and grants to another ONU different from the pair of ONUs a second window for transmitting a second message. If the first message is not received by the OLT, then the OLT indicates that the first ONU may be causing laser overlap. In another embodiment, the OLT grants to an ONU a window for transmitting a message to the OLT. If the message is not received by the OLT when expected, then the OLT indicates that the ONU may be causing laser overlap. Other embodiments are disclosed.

17 Claims, 15 Drawing Sheets

(56) References Cited

U.S. PATENT DOCUMENTS

| | | |
|---|---|---|
| 2011/0211837 A1 | 9/2011 | Sugawa et al. |
| 2011/0235727 A1* | 9/2011 | Yeung et al. ............... 375/259 |
| 2012/0039602 A1* | 2/2012 | Hood ............................ 398/38 |
| 2012/0128357 A1 | 5/2012 | Mukai et al. |
| 2012/0163808 A1* | 6/2012 | Kim et al. ..................... 398/30 |
| 2012/0166819 A1 | 6/2012 | Skubic et al. |
| 2012/0288279 A1* | 11/2012 | Zhang et al. .................. 398/66 |
| 2013/0034356 A1* | 2/2013 | Luo et al. ...................... 398/72 |
| 2013/0039182 A1* | 2/2013 | Das et al. ..................... 370/235 |
| 2013/0045005 A1* | 2/2013 | Nakura et al. ................ 398/25 |
| 2013/0156423 A1* | 6/2013 | Zhang et al. .................. 398/35 |
| 2013/0251362 A1* | 9/2013 | Li et al. ......................... 398/25 |
| 2014/0029947 A1* | 1/2014 | Wan et al. ..................... 398/67 |

OTHER PUBLICATIONS

Office Action for U.S. Appl. No. 13/106,768, dated Jan. 15, 2013, 16 pages.

Wuhan Telecommunication Devices Co., Ltd., "GE-PON ONU Optical Transceiver SFF Module", WTD Co., Ltd., RTXM169E-F(V1.0), Edition Dec. 2, 2004 (V.1.0), 5 pages.

IEEE P1904.1, "Power Saving", Service Interoperability in Ethernet Passive Optical Networks (SIEPON), D1.0, Nov. 8, 2010, 19 pages.

Office Action for U.S. Appl. No. 13/106,768, dated Jul. 1, 2013, 42 pages.

* cited by examiner

METHOD AND APPARATUS FOR LASER OVERLAP DETECTION

FIELD

This application relates to passive optical networks.

BACKGROUND

Access networks connect business and residential subscribers to the central offices of service providers, which in turn are connected to metropolitan area networks (MANs) or wide area networks (WANs). Often, these access networks are hybrid fiber coax (HFC) systems with an optical fiber based feeder network between the central office and a remote node, and an electrical distribution network between the remote node and subscribers. In so-called "Fiber-to-the-x" (FTTx) access networks, the copper-based distribution part of the access network is replaced with optical fiber, e.g., fiber-to-the-curb (FTTC) or fiber-to-the-home (FTTH). In doing so, the capacity of the access network is increased.

Passive optical networks (PONs) are optical networks that can be used in such applications. A PON is a point-to-multipoint, fiber to the premises network architecture in which unpowered optical splitters are used to enable a single optical fiber to serve multiple premises. A PON typically consists of at least one optical line terminal (OLT) at the service provider's central office and a number of optical network units (ONUs) near end users. A PON configuration can reduce the amount of fiber and central office equipment required compared with point to point architectures. Examples of types of PONs that are defined by international standard bodies include Ethernet Passive Optical Networks (EPONs) and Gigabit Passive Optical Networks (GPONs).

For downstream traffic, the OLT in the PON broadcasts content for all of the ONUs on a single broadcast channel. Addressing is used to identify the appropriate ONU for each packet of the content. However, for upstream traffic, the upstream bandwidth is time shared by all of the ONUs, and only one ONU can transmit data to the OLT at a time. Otherwise, traffic collision between the transmissions of two ONUs will occur. The OLT controls the time sharing of the bandwidth between the ONUs by allocating transmission windows to each ONU, during which each ONU is allowed to transmit upstream traffic. The transmission windows are granted using a time sharing scheme such that only one ONU can transmit to the OLT at a time.

However, if the local clock of one of the ONUs drifts, or if the ONU is failing or malfunctioning, the ONU may begin its transmission window too early or too late and thereby interfere with the transmission of another ONU. This interference may cause a traffic collision, which may result in the loss of data.

BRIEF DESCRIPTION

Embodiments of the present application will be described, by way of example only, with reference to the accompanying figures wherein.

Like reference numerals are used in different figures to denote similar elements.

DETAILED DESCRIPTION

Figure 1:
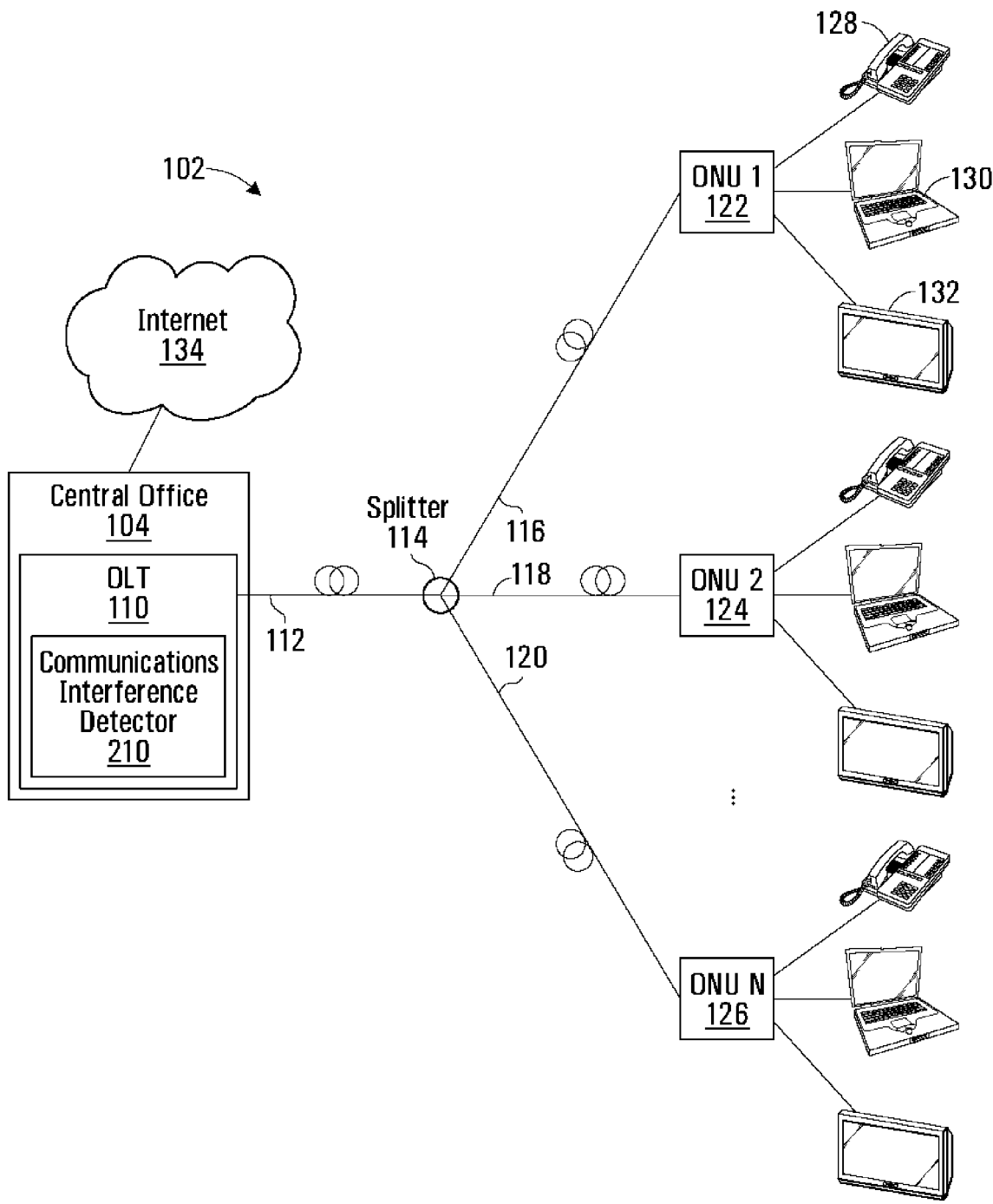
FIG. 1 is a block diagram illustrating one embodiment of a Passive Optical Network (PON)

In general, there are disclosed systems and methods that aim to detect whether there is a communications interference resulting in a loss of data, and if so, identify whether a particular ONU is the cause of the problem.

For example, if a local clock of an ONU drifts, or if the ONU is failing or malfunctioning, the ONU may begin transmitting its data to the OLT too early or too late and thereby interfere with the transmission of another ONU. An interference of this type is referred to laser overlap, since the overlap in transmissions between the two ONUs is due to the lasers of each of the two ONUs being on and transmitting data at the same time. Some embodiments disclosed herein aim to detect if there is a communications interference resulting in a loss of data, and if so, detect whether a particular ONU may be causing laser overlap.

In one example embodiment, the OLT monitors the incoming data to detect if/when there are consistent packet errors during transmissions from an ONU or an unusually large number of packet errors during a transmission from an ONU. If so, then this is an indication that there is a communications interference. The OLT can then perform one of a number of methods for determining whether a particular ONU may be causing laser overlap resulting in the detected communications interference.

For example, in one embodiment, the OLT selects a suspected pair of ONUs as follows: (1) the ONU from which the data is received having the packet errors is selected as one of the pair of ONUs, and is designated ONU 1; and (2) the ONU for which a transmission window was granted after, but adjacent to ONU 1 is selected as the other of the pair of ONUs, and is designated ONU 2.

The OLT then grants to ONU 1 a transmission window that is only long enough to transmit a REPORT message, and grants to another ONU not suspected of causing the communications interference another transmission window that is also only long enough to transmit a REPORT message. The transmission window granted to the another ONU is scheduled to begin later than but close to the end of the transmission of the REPORT message from ONU 1.

If the REPORT message transmitted from ONU 1 is not received by the OLT, then it is an indication that ONU 1 may be causing laser overlap, whereas if the REPORT message transmitted from ONU 1 is received, then it is an indication that ONU 2 may be causing the laser overlap.

The example method summarized above will be explained in more detail below. Other example methods for detecting which ONU may be causing laser overlap are also explained in detail below.

For illustrative purposes, embodiments will now be explained in greater detail below in conjunction with the figures.

The embodiments set forth herein represent the necessary information to practice the claimed subject matter and illustrate the best way of practicing such subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to computer readable storage medium or media for storage of information, such as computer readable instructions, data structures, program modules, or other data. A non-exhaustive list of examples of computer readable storage media include magnetic cassettes, magnetic tape, magnetic disk storage or other magnetic storage devices, optical disks such as CD-ROM, DVDs, Blu-ray, or other optical storage, volatile and non-volatile, removable and non-removable media implemented in any method or technology, RAM, ROM, EEPROM, flash memory or other memory technology. Any such computer storage media may be part of the device or accessible or connectable thereto. Any application or module herein described may be implemented using computer readable/executable instructions that may be stored or otherwise held by such computer readable storage media.

Referring first to FIG. 1, an example of a PON 102 is illustrated. The PON 102 has a physical tree topology with a central office 104 located at the root and subscribers (e.g. 128, 130, and 132) connected to the leaf nodes of the tree. At the root of the tree is an OLT 110, which resides in service provider equipment (not shown) at the central office 104. The OLT 110 is the gateway that connects to the global Internet 134 and/or another network (not shown), such as a private network. The PON 102 connects the OLT 110 to multiple ONUs 122, 124, and 126 through a 1:N optical splitter/combiner 114. In the illustrated example, there are N ONUs, but only three are illustrated, specifically labeled "ONU 1" 122, "ONU 2" 124, . . . , "ONU N" 126. More specifically, a shared optical fiber 112 connects the OLT 110 to the 1:N optical splitter/combiner 114, and a respective optical fiber 116, 118, and 120 connects the 1:N optical splitter/combiner to each ONU 122, 124, and 126. The PON 102 is only one example of a PON. The embodiments described below can be implemented in other PONS.

In the example PON 102 illustrated in FIG. 1, each of the ONUs 122, 124, and 126 may serve a single residential or business subscriber, referred to as Fiber-to-the-Home/Business (FTTH/B), or multiple subscribers, referred to as Fiber-to-the-curb (FTTC). Each of the ONUs 122, 124, and 126 may be connected to one or more devices, such as a telephone, computer, printer, media access device, tablet, router and/or television set. In the specific example illustrated in FIG. 1, ONU 122 is shown connected to telephone 128, computer 130, and television 132.

Due to the directional properties of the optical splitter/combiner 114, the OLT 110 is able to broadcast data to all ONUs 122, 124, and 126 in the downstream direction. In the upstream direction, however, ONUs 122, 124, and 126 do not communicate directly with one another. Instead, each one of the ONUs 122, 124, and 126 is only able to send data to the OLT 110. Thus, in the downstream direction the PON 102 may be viewed as a point-to-multipoint network, and in the upstream direction, the PON 102 may be viewed as a multipoint-to-point network.

For downstream traffic, the OLT 110 broadcasts content for all of the ONUs 122, 124, and 126 on a single broadcast channel. Addressing is used to identify the appropriate ONU for each packet of the content. For upstream traffic, the upstream bandwidth is time shared by all of the ONUs 122, 124, and 126, and during regular operation only one ONU transmits data to the OLT 110 at a time to avoid traffic collision. The OLT 110 controls the time sharing of the bandwidth between the ONUs 122, 124, and 126 by allocating time windows (also referred to as transmission windows) to each ONU, during which each ONU is allowed to transmit upstream traffic. The time windows are granted using a time sharing scheme such that only one ONU can transmit to the OLT 110 at a time. When a new ONU (not shown) enters into the PON 102, the OLT 110 will not be aware of it and will not allocate any time windows to it. To allow for new ONUs to join, the OLT 110 periodically allocates a "discovery window". The allocation is signalled on the downlink broadcast channel, so that all ONUs including a new ONU that has not yet registered can receive it.

A multipoint control protocol (MPCP) is used to facilitate the allocation of time windows and the joining of new ONUs. One example of a MPCP is described in the EPON portion of the collection of standards under IEEE Std 802.3.

The OLT 110 is an example of an OLT in accordance with one embodiment. The OLT 110 includes a communications interference detector 210 that aims to detect whether there is a communications interference, and if so, whether one or more of the ONUs (ONU 1, ONU 2, . . . , ONU N) is the cause of the communications interference.

Figure 2:
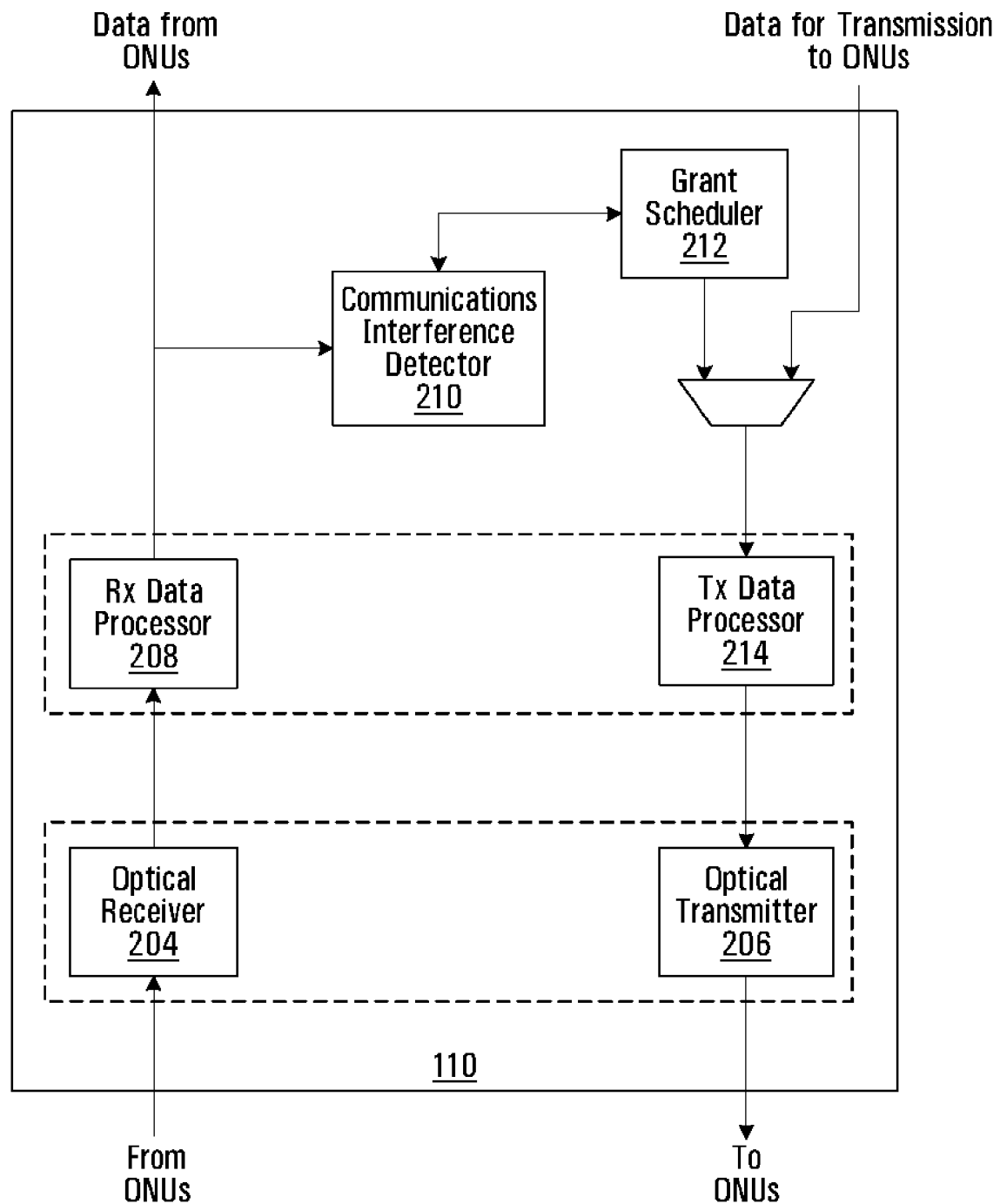
FIG. 2 is a block diagram illustrating one embodiment of an Optical Line Terminal (OLT)

FIG. 2 illustrates the OLT 110 in greater detail. It will be appreciated that not all of the components described and illustrated in the OLT 110 are necessarily used in order to perform the methods described below. It will also be appreciated that other components of the OLT 110 may also be present, but have been omitted for the sake of clarity.

The OLT 110 includes an optical receiver 204 for receiving data from the ONUs 122, 124, and 126, and an optical transmitter 206 for transmitting data to the ONUs 122, 124, and 126. A stippled box is illustrated surrounding the optical receiver 204 and the optical transmitter 206 in order to demonstrate that the receiver 204 and transmitter 206 may be integrated into a single optical transceiver.

In the upstream direction, data received at the optical receiver 204 is forwarded to a receive data processor 208. The receive data processor 208 performs any necessary physical layer processing, such as deserializing the received data, performing decoding, and/or performing decryption, as well as any necessary medium access control (MAC) layer processing, such as mapping the received data into frames that are readable by higher layers and that are readable by the communications interference detector 210. The processed data from the receive data processor 208 is then forwarded from the OLT 110, for example, to a switch or a backplane (not shown).

In the downstream direction, packets to be transmitted to the ONUs 122, 124, and 126 are multiplexed with grant data from a grant scheduler 212. The data for transmission is then processed by a transmit data processor 214. The transmit data processor 214 performs any necessary MAC layer processing, such as removing the framing structure, and any necessary physical layer processing, such as serializing, encoding, and/or encrypting the data. The data is then transmitted through the PON 102 to the ONUs 122, 124, and 126 via the optical transmitter 206.

A stippled box is illustrated surrounding the receive data processor 208 and the transmit data processor 214 in order to demonstrate that these processing functions may be integrated into a single chip or unit.

As explained earlier with reference to FIG. 1, the OLT 110 broadcasts content for all of the ONUs 122, 124, and 126 on a single broadcast channel, and addressing is used to identify the appropriate ONU for each packet of the content.

However, for upstream traffic, the upstream bandwidth is time shared by all of the ONUs 122, 124, and 126. The OLT 110 controls the time sharing of the bandwidth between the ONUs 122, 124, and 126 by allocating time windows (also called transmission windows) to each ONU, during which each ONU is allowed to transmit upstream traffic. It is the grant scheduler 212 that grants these time windows. For example, a scheduled grant may indicate that a particular ONU (say ONU 122) is to begin transmitting data at a time A and can transmit data for a specified duration (e.g. a particular number of microseconds).

A local clock at each of the ONUs 122, 124, and 126 is controlled and maintained, for example, using time stamps from the clock of the OLT 110, in order to prevent the transmissions of different ONUs from overlapping and thereby possibly causing communications interference. However, if the local clock of one of the ONUs drifts, or the ONU is failing or malfunctioning, then that ONU may begin transmitting data earlier than or later than it is supposed to (from the perspective of the OLT 110), and thereby possibly overlap with the beginning of or the end of a transmission from another ONU. If there is an overlap in data transmission between two ONUs, this is referred to as laser overlap, since the lasers of each of the two ONUs are turned on and transmitting data at the same time. Traffic collision may occur, and data from one or both of the ONUs may be lost.

The OLT 110 includes a communications interference detector 210 that monitors the data received from the ONUs and searches for an indication of a communications interference. For example, in some embodiments, the communications interference detector 210 detects if there are consistent packet errors during transmissions from a particular ONU, or if an unusually large number of packet errors occur during a transmission from an ONU. If so, the communications interference detector 210 considers this to be an indication of a communications interference. As one example, the communications interference detector 210 may maintain a running count of how many cyclic redundancy check (CRC) packet errors occur in one or more transmissions from a particular ONU. If the number of CRC packet errors exceeds a predetermined threshold, then a communications interference is indicated. As another example, a higher layer function or application may inform the communications interference detector 210 if the number of packet errors from an ONU is unusually large, consistent, or above a given threshold. If so, then the communications interference detector 210 indicates that there is a communications interference.

Once a communications interference is detected, the communications interference detector 210 attempts to determine which ONU (if any) may be causing the communications interference. A variety of methods for making this determination are possible. A few example methods are explained below.

A first example method is described with reference to FIG. 3. This figure illustrates method steps performed by the OLT 110 under the control of the communications interference detector 210. It will be appreciated that in some embodiments, instructions for implementing the method may be stored as code on a computer readable medium, and that the instructions can be executed by the communications interference detector 210 and the grant scheduler 212, or more generally, by one or more processing units in the OLT 110. In other embodiments, the OLT 110 can comprise control logic for performing the method.

First, in step 302, the communications interference detector 210 selects a pair of ONUs, the pair of ONUs comprising a first ONU and a second ONU. At least one of the pair ONUs is either suspected of possibly causing the communications interference, or is assumed to possibly be causing the communications interference. In some embodiments the OLT may know with certainty that at least one of the pair of ONUs is causing the communications interference.

In one embodiment, the pair of ONUs is selected as follows: (1) the ONU from which the data was received having the packet errors which caused the communications interference to be detected is selected as one of the pair of ONUs, and is designated as the first ONU of the pair; and (2) the ONU for which a transmission window was granted later, but adjacent to the first ONU is selected as the other of the pair of ONUs, and is designated as the second ONU.

Next, in step 304, the OLT 110 performs the steps of at least one of branch 304a and branch 304b.

In branch 304a: (1) In step 306a the communications interference detector 210 instructs the grant scheduler 212 to grant to the first ONU a first time window for transmitting a first message from the first ONU to the OLT 110. (2) In step 308a the communications interference detector 210 instructs the grant scheduler 212 to grant to another ONU different from both the first ONU and the second ONU a second time window for transmitting a second message from the another ONU to the OLT 110, the second time window scheduled, from the perspective of the OLT 110, to begin at a select time later than the beginning of the first time window for the purpose of enabling communications interference detection. In some embodiments, the second time window is scheduled, from the perspective of the OLT 110, to begin adjacent to or partially overlapping the first time window and later than the scheduled transmission of the first message. An embodiment in which the second time window is scheduled to partially overlap the first time window is described later with respect to FIGS. 6 to 14. (3) Then, in step 310a, if the first message is not received by the OLT 110, then indicating that the first ONU may be causing communications interference. For example, the indication may indicate that the first ONU may be causing laser overlap.

In branch 304b: (1) In step 306b the communications interference detector 210 instructs the grant scheduler 212 to grant to another ONU different from both the first ONU and the second ONU a third time window for transmitting a third message from the another ONU to the OLT 110. (2) In step 308b the communications interference detector 210 instructs the grant scheduler 212 to grant to the second ONU a fourth time window for transmitting a fourth message from the second ONU to the OLT, the fourth time window scheduled, from the perspective of the OLT, to begin at a select time later than the beginning of the third time window for the purpose of enabling communications interference detection. In some embodiments, the fourth time window is scheduled, from the perspective of the OLT, to begin adjacent to or partially overlapping the third time window and later than the scheduled transmission of the third message. (3) Then, in step 310b, if the third message is not received by the OLT, then indicating that the second ONU may be causing communications interference. For example, the indication may indicate that the second ONU may be causing laser overlap.

Since the another ONU is different from both the first ONU and the second ONU it is assumed to be operating correctly, that is, it is assumed to not be causing communications interference. In some embodiments, the another ONU is selected as an ONU from which previous data packets were successfully received without errors (or with only a few incidental errors), and for which data packets transmitted from ONUs granted transmission windows adjacent to the another ONU were successfully received without errors (or with only a few incidental errors), indicating that the another ONU is likely operating properly. In other embodiments, the OLT 110 may know with certainty that the another ONU is not causing the communications interference, or suspects that the another ONU is not causing the communications interference.

In branch 304a, the second ONU is effectively replaced with the another ONU, which is assumed, suspected, or known to be operating properly. By such a replacement, if the message from the first ONU (i.e. the first message) is missed in step 310a, then it is an indication that the first ONU may be causing the communications interference, since the communications interference appears to still be occurring even though the second ONU has been replaced with another ONU that is assumed, suspected, or known to be operating properly. On the other hand, if the message from the first ONU (i.e. the first message) is received, then it is an indication that second ONU may be causing the communications interference, since the communications interference appears to have disappeared with the replacement of the second ONU with the another ONU that is suspected, assumed, or known to be operating properly. This is illustrated as optional step 312a in branch 304a.

In branch 304b, the first ONU is effectively replaced with the another ONU, which is assumed, suspected, or known to be operating properly. By such a replacement, if the message from the another ONU (i.e. the third message) is missed in step 310b, then it is an indication that the second ONU may be causing the communications interference, since the communications interference appears to still be occurring even though the first ONU has been replaced with another ONU that is assumed, suspected, or known to be operating properly. On the other hand, if the message from the another ONU (i.e. the third message) is received, then it is an indication that first ONU may be causing the communications interference, since the communications interference appears to have disappeared with the replacement of the first ONU with the another ONU that is suspected, assumed, or known to be operating properly. This is illustrated as optional step 312b in branch 304b.

Figure 3:
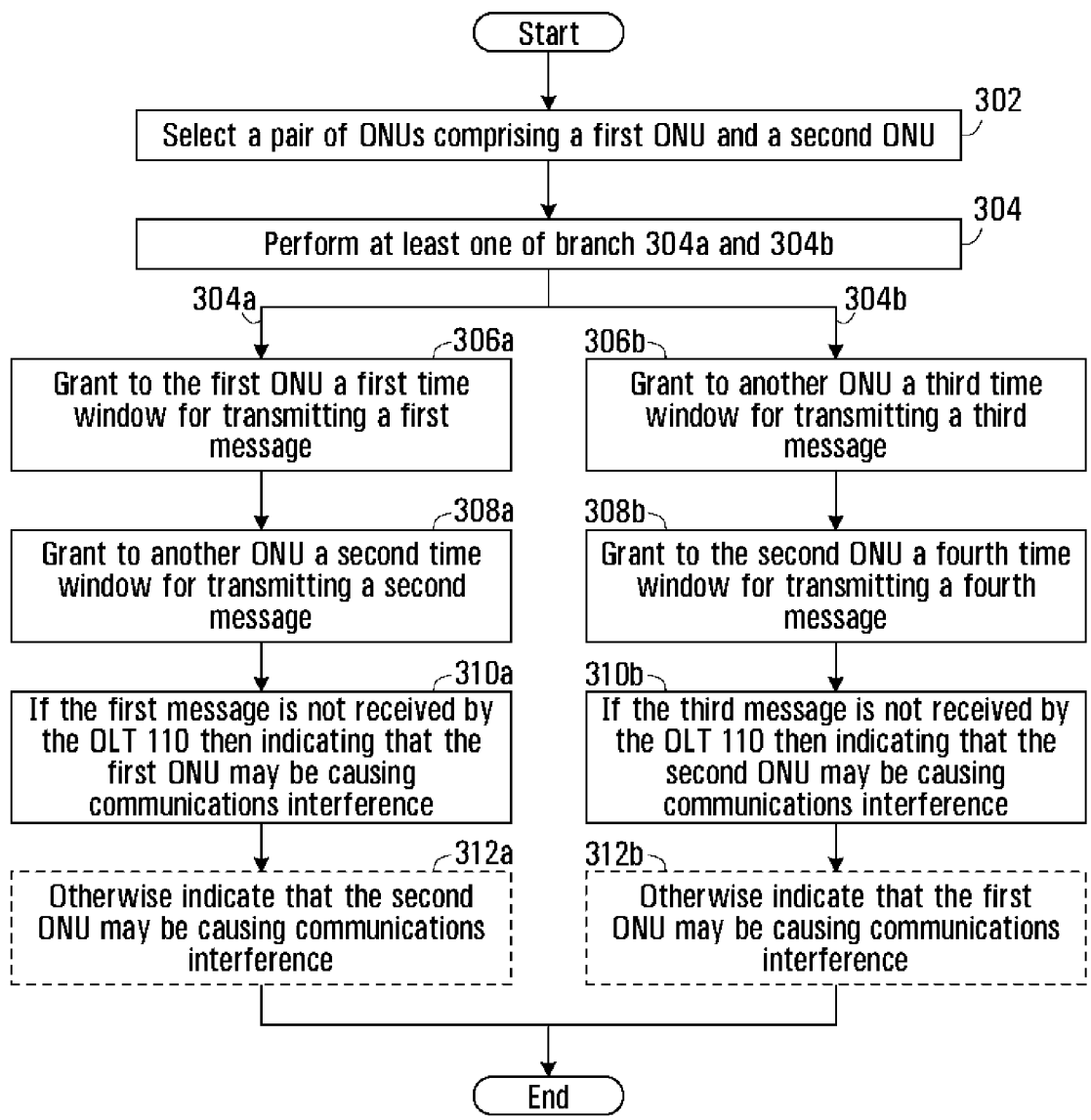
FIG. 3 is a flow chart of one embodiment of a method of determining an Optical Network Unit (ONU) that may be causing communications interference.

In some embodiments of the method of FIG. 3, both branch 304a and branch 304b can be performed.

A second example method for attempting to determine which ONU may be causing a communications interference is described with reference to FIG. 4. As with FIG. 3, this figure also illustrates method steps performed by the OLT 110 under the control of the communications interference detector 210. It will be appreciated that in some embodiments, instructions for implementing the method may be stored as code on a computer readable medium, and that the instructions can be executed by the communications interference detector 210 and the grant scheduler 212, or more generally, by one or more processing units in the OLT 110. In other embodiments, the OLT 110 can comprise control logic for performing the method.

First, in step 402, the communications interference detector 210 instructs the grant scheduler 212 to grant to an ONU a time window for transmitting a message from the ONU to the OLT 110. The ONU is suspected of causing the communications interference. For example, in some embodiments, the ONU may be one of the pair of ONUs selected in step 302 of the method of FIG. 3.

Then, in step 404, if the message is not received by the OLT 110 during an expected window of arrival, then the communications interference detector 210 indicates that the ONU may be causing communications interference.

In some embodiments, if the message is received by the OLT 110 later than the expected window of arrival, then the communications interference detector 210 indicates that the ONU may be causing communications interference by turning on its laser too late, and if the message is received by the OLT 110 earlier than the expected window of arrival, then the communications interference detector 210 indicates that the ONU may be causing communications interference by turning on its laser too early.

In some embodiments, the expected window of arrival is computed as follows. A start time of the expected window of arrival is computed by the communications interference detector 210 as an expected arrival time of the beginning of the message minus a margin, and an end time of the expected window of arrival is computed by the communications interference detector 210 as the expected arrival time of the end of the message plus another margin. The margin and the another margin may be different or the same. These margins are implementation specific and are meant to capture small variations that may cause the message transmitted from the ONU to arrive slightly later or earlier than expected, even if the ONU transmitted the message at the correct time. For example, such a variation may occur due to slight variations in the round trip time (RTT) between the ONU and the OLT 110. The expected arrival time of the start of the message and end of the message are known by the OLT 110 because the OLT 110 knows the RTT between the ONU and the OLT 610, the scheduled start time of the time window granted to the ONU by the grant scheduler 212, and the duration of the message.

It will be appreciated that in the example methods described above, it is not determined conclusively which ONU (if any) is causing the communications interference, which is why the indication made by the communications interference detector is an indication that the ONU may be causing communications interference. For example, the communications interference detected by the communications interference detector 210 may not even be caused by an ONU, but instead may be due to other reasons not related to the ONUs, such as noise in the transmission medium. Thus, in steps 310a, 310b, and 404, the communications interference detector 210 indicates that a particular ONU may be causing a communications interference. Even if in a specific implementation the indication comprises a bit or other signal making an indication that a particular ONU is causing a communications interference, this is simply the decision or conclusion of the communications interference detector 210. However, the communications interference detector 210 will never know with 100% exact certainty that the communications interference is for sure caused by the indicated ONU, which is why such an indication is still actually an indication that the indicated ONU may be causing the communications interference. Even though the indication in steps 310a, 310b, and 404 is an indication that the ONU may be causing a communications interference (rather than is for sure), the method is still beneficial, as it provides an indication that a particular ONU may (or perhaps likely is) the cause of a communications interference, and this can allow the communications interference detector 210, or an operator, to investigate this in more detail or assume (just to be safe) that the indicated ONU is causing communications interference and take the appropriate action.

It will also be appreciated that in the methods described above with reference to FIGS. 3 and 4 that it is known or assumed that the suspected ONU or pair of ONUs is/are online and have the ability to transmit messages to the OLT 110. Otherwise, it could be the case that an ONU suspected of causing communications interference is simply offline or has completely failed and simply does not transmit the expected messages. In some embodiments, it is first confirmed or assumed that the suspected ONU(s) are online, registered, and have not completely failed.

Figure 5:
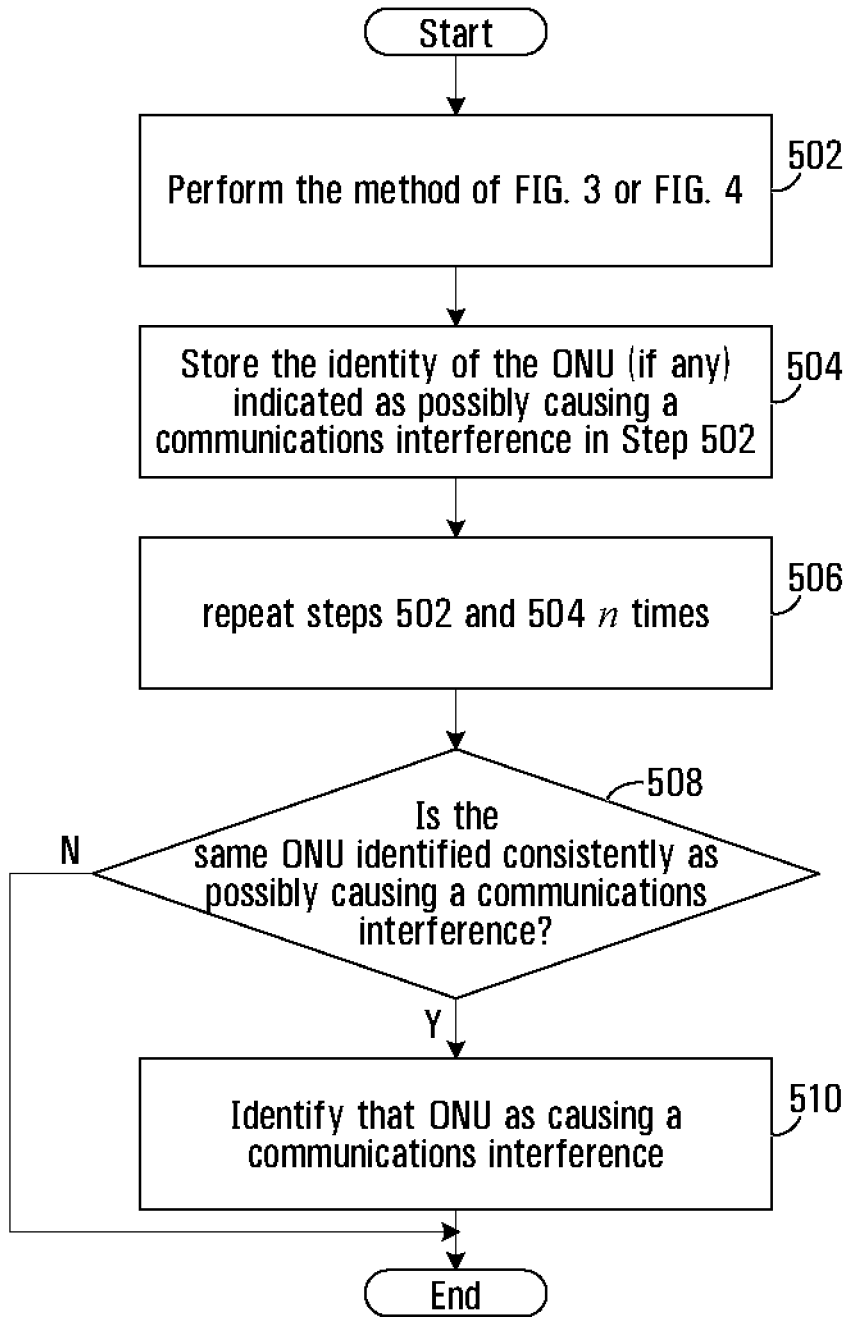
FIG. 5 is a flow chart of still another embodiment of a method of determining an ONU that may be causing communications interference.

FIG. 5 illustrates another method for attempting to determine whether a particular ONU is causing a detected communications interference. The method steps are performed by the communications interference detector 210. It will be appreciated that in some embodiments, instructions for implementing the method may be stored as code on a computer readable medium, which can be executed by the communications interference detector 210, or more generally, by one or more processing units either in the OLT 110 or in communication with the OLT 110.

Figure 4:
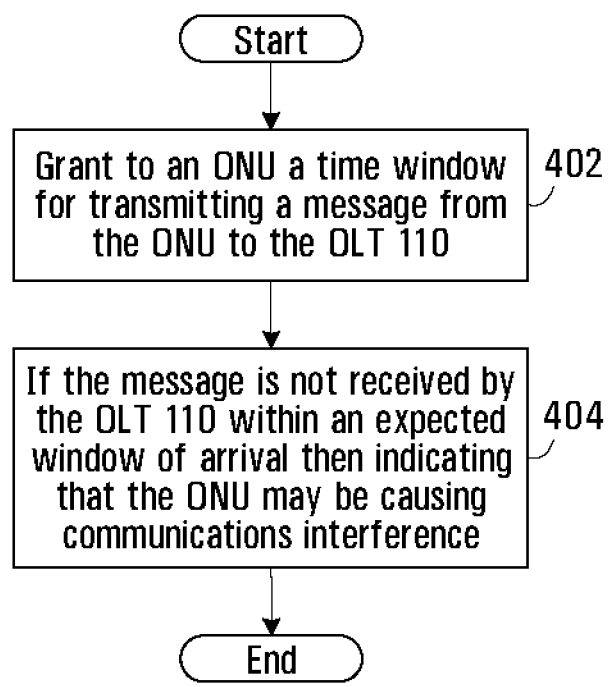
FIG. 4 is a flow chart of another embodiment of a method of determining an ONU that may be causing communications interference.

In step 502, the method of FIG. 3 or FIG. 4 is performed. In step 504, the identity of the ONU (if any) indicated as possibly causing the communications interference is stored in memory by the communications interference detector 210. Then, in step 506, steps 502 and 504 are repeated n times. Each time steps 502 and 504 are repeated, the ONU (if any) indicated as possibly causing the communications interference is stored in memory.

Then, in step 508, it is determined whether the same ONU is identified consistently as possibly causing communications interference. For example, in one embodiment, the ONU indicated as possibly causing communications interference must be the same in each of the n executions of steps 502 and 504. In other embodiments, the ONU indicated as possibly causing communications interference must be the same in the majority of the n executions of steps 502 and 504. If, in step 508, the same ONU is identified consistently as possibly causing communications interference, then in step 510 that ONU is identified as causing communications interference. The value of n is implementation specific.

In some embodiments, the method of FIG. 5 can be performed automatically by the communications interference detector 210, while in other embodiments, a separate system may be provided that allows a user or operator to control whether FIG. 5 is performed, as well as control the value of n. An example of such a system comprises a computer having a graphical display that represents at least a portion of the PON 102. The system includes a communication interface for communicatively connecting the computer to the OLT 110. A user interface of the computer allows a user or operator to perform the method of FIG. 5 and display the ONU or ONUs identified as possibly causing the communications interference.

Once an ONU is indicated as causing communications interference (as in step 510 of FIG. 5), or even if an ONU is indicated as possibly causing communications interference (as in steps 310a or 310b or FIG. 3 or step 404 of FIG. 4), then, in some embodiments, the OLT 110 can take corrective action to eliminate the communications interference. For example, in one embodiment the OLT 110 can either deregister the ONU causing (or suspected or assumed to be causing) the communications interference, or instead perform at least one of the following:

(i) reduce a duration of a transmission window granted to the problem ONU;
(ii) increase a duration of time between an end of an earlier and adjacent transmission window granted to another ONU and a start of a transmission window granted to the problem ONU; and
(iii) increase a duration of time between an end of a transmission window granted to the problem ONU and a start of a later and adjacent transmission window granted to another ONU.

At least one of (i) to (iii) above can help alleviate a communications interference due to laser overlap by causing the problem ONU to modify when it is scheduled to transmit its data. The modification can reduce or eliminate the laser overlap. For example, from the investigations, the user may be able to determine that the ONU causing laser overlap is turning on its laser too early, in which case the transmission window granted to the ONU can be modified to begin later. Or more generally, the duration of time between the end of the adjacent earlier transmission window and the start of the transmission window granted to the problem ONU can be increased. As another example, from the investigations, the user may be able to determine that the ONU causing laser overlap is turning off its laser too late, in which case the transmission window granted to the ONU can be modified to end earlier. Or more generally, the duration of time between the end of the transmission window granted to the problem ONU and the start of the next adjacent transmission window can be increased.

It will be appreciated that the exact modification of (i) to (iii) above is implementation specific, but is easily computable once it is known which ONU is the problem ONU.

A few specific example implementations will now be described in detail below in the specific context of an Ethernet Passive Optical Network (EPON). However, as is clear from the above, the methods described above are not limited to EPON applications.

Figure 6:
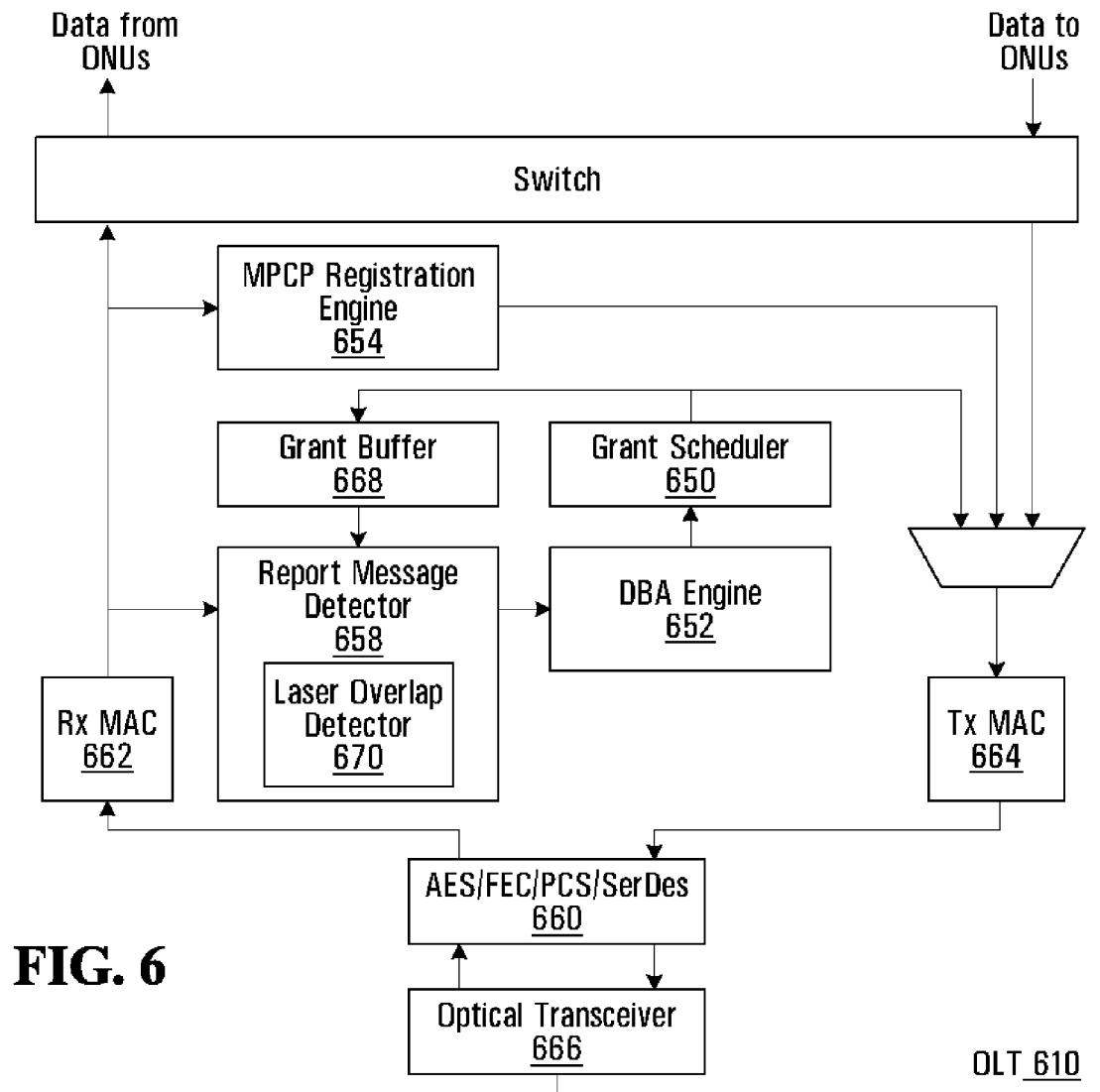
FIG. 6 is a block diagram illustrating another embodiment of an OLT.
Figure 6:
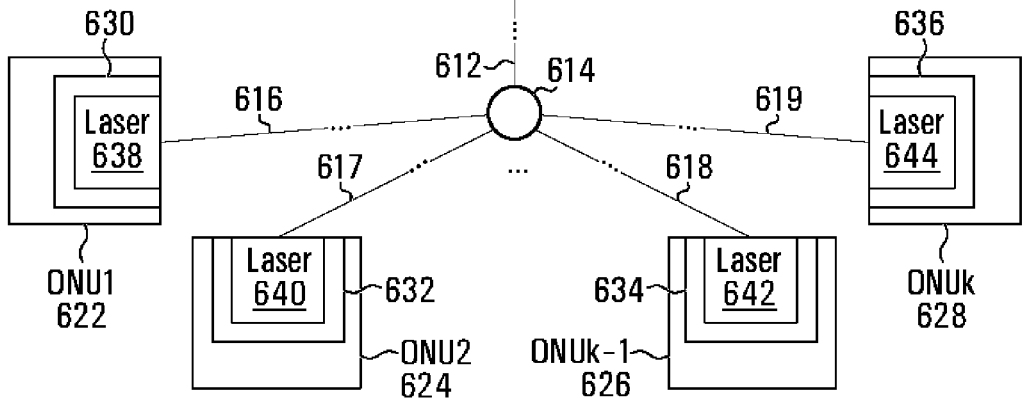

Turning therefore to FIG. 6, another PON is illustrated that includes an OLT 610, which connects to multiple ONUs 622, 624, 626, and 628 through a 1:K optical splitter/combiner 614. In the illustrated example, there are K ONUs, but only four are illustrated, specifically labelled "ONU 1" 622, "ONU 2" 624, . . . , "ONU K−1" 626, and "ONU K" 628. A shared optical fiber 612 connects the OLT 610 to the 1:K optical splitter/combiner 614, and a respective optical fiber 616, 617, 618, and 619 connects the 1:K optical splitter/combiner 614 to each ONU 622, 624, 626, and 628.

The details of each of the ONUs 622, 624, 626, and 628 are omitted for the sake of clarity, except to illustrate that each ONU 622, 624, 626, and 628 includes a respective optical transceiver 630, 632, 634, and 636, and each respective optical transceiver includes a laser 638, 640, 642, and 644.

Figure 7:
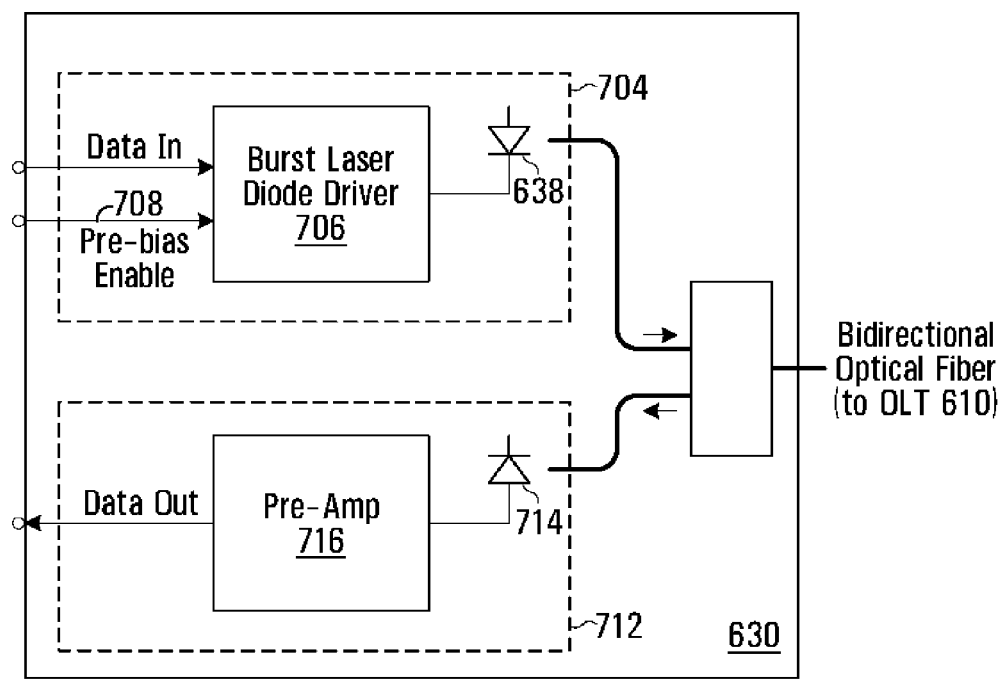
FIG. 7 is a block diagram illustrating an embodiment of an optical transceiver.

An example of the optical transceiver 630 of the ONU 622 is shown in greater detail in FIG. 7. It will be appreciated that other components of the optical transceiver 630 may also be present, but have been omitted for the sake of clarity.

The optical transceiver 630 includes an optical transmitter 704, which includes a burst laser diode driver 706 that drives the laser 638. The laser 638 in this illustrated embodiment is implemented as a laser diode. A laser burst control signal from the ONU 622 drives a pre-bias enable 708 to turn on and off the laser beam emitted by the laser diode 638.

The optical transceiver 630 also includes an optical receiver 712, which includes a photo diode 714 for receiving an optical signal, as well as a pre-amp 716 and possible other processing circuitry (not shown) for processing the received optical signal.

The optical transceivers of the other ONUs may have a similar structure.

Returning now to FIG. 6, for downstream traffic, the OLT 610 broadcasts content for all of the ONUs 622, 624, 626, and 628 on a single broadcast channel. Addressing is used to identify the appropriate ONU for each packet of the content. For upstream traffic, the upstream bandwidth is time shared by all of the ONUs 622, 624, 626, and 628, and during regular operation only one ONU transmits data to the OLT 610 at a time to avoid traffic collision. The OLT 610 controls the time sharing of the bandwidth between the ONUs 622, 624, 626, and 628 by allocating transmission windows (or more generally, time windows), to each ONU, during which each ONU is allowed to transmit upstream traffic. The transmission windows are granted using a time sharing scheme such that only one ONU can transmit to the OLT 610 at a time. When a new ONU (not shown) enters into the PON, the OLT 610 will not be aware of it and will not allocate any transmission windows to it. To allow for new ONUs to join, the OLT 610 periodically allocates a "discovery window". The allocation is signalled on the downlink broadcast channel, so that all ONUs including a new ONU that has not yet registered can receive it.

A multipoint control protocol (MPCP) is used to facilitate the allocation of transmission windows and the joining of new ONUs. As mentioned earlier, an example of a MPCP is described in the EPON portion of the collection of standards under IEEE Std 802.3.

As part of the MPCP of the illustrated example, MPCP frames are received by and generated in the OLT 610. The MPCP frames that are generated in the OLT 610 include:

1) 'GATE' messages—each GATE message defines one or more transmission windows during which a particular ONU (e.g. ONU 622, 624, 626, or 628) is permitted to transmit data to the OLT 610. GATE messages are generated by a grant scheduler 650 in the OLT 610, which is controlled by a dynamic bandwidth allocation (DBA) engine 652. The DBA engine 652 controls the granting of transmission windows in a dynamic manner, taking into consideration the amount of data requested to be transmitted by each of the ONUs 622, 624, 626, and 628. The DBA engine 652 grants non-overlapping transmission windows to each of the ONUs 622, 624, 626, and 628 in order to avoid traffic collision. The GATE message sent to each ONU typically includes the start time of the transmission window allocated to the ONU and the duration of the allocated transmission window. The GATE message also typically includes a time stamp indicating the time at which the GATE message was sent from the OLT. The ONU receiving the GATE message adjusts its local clock to the value of the time stamp. In this way, the local clock of the ONU can be updated by the OLT 610 each time a GATE message is sent in order to ensure it maintains a local time consistent with the local time of the OLT 610 (specifically, the local time of the ONU will be the local time of the OLT 610 offset by the downstream transmission time from the OLT 610 to that ONU). This process is described in more detail later with respect to FIG. 9. As also explained below, the GATE message typically also includes a flag indicating whether the ONU should send a REPORT frame.

2) 'DISCOVERY_GATE' messages—each DISCOVERY_GATE message defines a discovery window that allows a newly connected or offline ONU to register with the OLT 610. DISCOVERY_GATE messages are generated by a MPCP registration engine 654.

3) 'REGISTER' messages—a 'REGISTER' message is transmitted from the OLT 610 to a particular ONU connected to the OLT 610 as part of the registration handshaking process when the ONU first registers with the OLT 610. REGISTER messages are also generated by the MPCP registration engine 654.

The MPCP frames generated by the OLT 610 are multiplexed with data to be transmitted to the ONUs at a multiplexer 656.

The MPCP frames that are received at the OLT 610 include:

1) 'REPORT' messages—these messages are regularly transmitted by each of the ONUs 622, 624, 626, and 628. Each REPORT message provides information to the OLT 610 that is representative of the amount of data waiting to be transmitted to the OLT 610 from the ONU that sent the REPORT message. REPORT messages are extracted by a REPORT message detector 658 in the OLT 610. The DBA engine 652 uses the information in the REPORT messages when granting duration and periodicity of transmission windows in GATE messages. A REPORT message typically provides other information also, such as a time stamp used by the OLT 610 for round-trip-time calculations.

2) 'REGISTER_REQ' and 'REGISTER_ACK' messages—these messages are received by the OLT 610 from a particular ONU as part of the registration handshaking process when the ONU first registers with the OLT 610. These messages are processed by the MPCP registration engine 654.

As shown in FIG. 6, the OLT 610 also includes an optical transceiver 666, an AES/FEC/PCS/SerDes processing block 660, a Rx MAC block 662, and a Tx MAC block 664. The optical transceiver 666 converts between the electrical and optical domain, transmitting data to and receiving data from each of the ONUs 622, 624, 626, and 628. The optical transceiver 666 may have a structure similar to that illustrated in FIG. 7. The AES/FEC/PCS/SerDes block 660 implements physical layer functions, such as the physical coding sublayer, encryption/decryption, error control coding, and serialization/deserialization. All of these functions are illustrated as one block simply for clarity of illustration. The Rx MAC block 662 maps the received data into frames readable by higher layers in the OLT 610, and the Tx MAC block 664 removes such frames.

The OLT 610 also includes a grant buffer 668, which stores a copy of the grant information relating to each of the transmission windows granted to the ONUs 622, 624, 626, and 628. For a given grant, the grant buffer 668 will typically store: the start time of the granted transmission window and the duration of the granted transmission window, as well as possibly other information related to the grant, such as whether a REPORT message is to be transmitted during the transmission window, and the laser overhead (e.g. a laser on and laser off time). As explained in more detail later, at least some of this information stored in the grant buffer 668 is used by a laser overlap detector 670 in the REPORT message detector 658 in order to determine whether an expected REPORT message has been missed.

Figure 8:
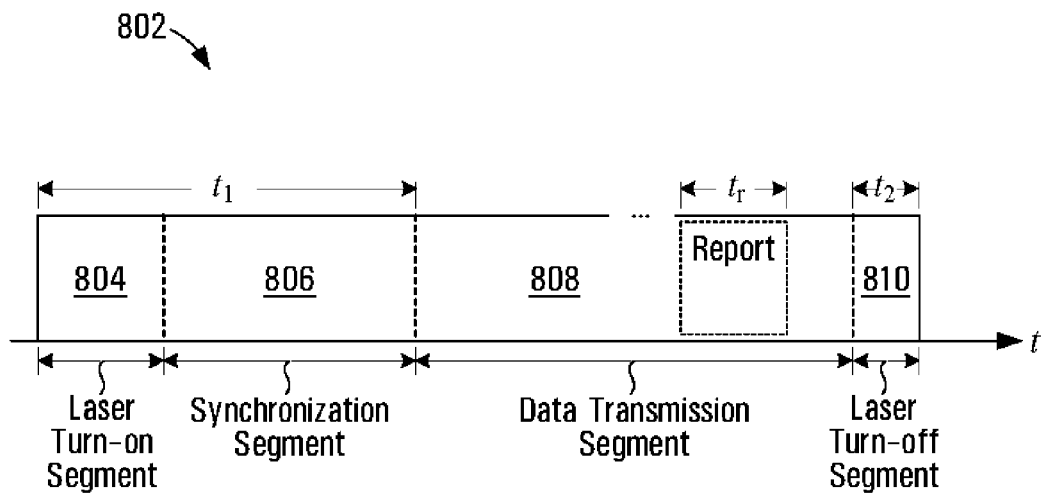
FIG. 8 illustrates a typical transmission window granted to an ONU.

A transmission window granted to an ONU, say ONU 622, is partitioned as shown in FIG. 8. The first portion of the transmission window 802 consists of a laser turn-on segment 804, which represents the time during which the laser 638 powers-up to full strength. This laser turn-on time is substantially constant and is typically either a standard value known in advance, or a value that is specific to each ONU and delivered to the OLT 610 during registration of the ONU. The next portion of the transmission window consists of a synchronization segment 806, which represents the duration of time it takes to synchronize the receiving clock of the OLT 610 to transmissions from the ONU 622. During this segment, the ONU 622 transmits to the OLT 610 a special data pattern that allows for such synchronization. The synchronization time is typically assigned to the ONU 622 by the OLT 610, as it is a parameter specific to the OLT 610. Upon completion of synchronization, transmission of data to the OLT 610 begins, and is transmitted during the data transmission segment 808. During the data transmission segment 808, a REPORT message may or may not be transmitted. A REPORT message is shown as being transmitted in the transmission window illustrated in FIG. 8. At the end of the data transmission segment 808, the laser 638 is turned off during the laser turn-off segment 810. The laser turn-off time is also substantially constant and is typically either a standard value known in advance, or a value that is specific to each ONU and delivered to the OLT 610 during registration of the ONU.

Thus, as shown in FIG. 8, during the granted transmission window 802, the ONU 622 turns on its laser 638, transmits data, and completely turns off its laser 638 during its allocated window.

As also shown in FIG. 8, the sum of the laser turn-on segment 804 and the synchronization segment 806 is substantially longer than the laser turn-off segment 810, and in some cases is even longer than sum of the duration of time it takes to transmit a REPORT message and the laser turn-off segment 810. That is, time $t_1$ in FIG. 8 is substantially longer than time $t_2$, and may even be longer than $t_r + t_2$.

The GATE message issued by the OLT 610 that allocates the transmission window 802 to the ONU 622 also indicates whether the ONU 638 must transmit a REPORT message during the transmission window 802. This can be achieved, for example, by setting a predetermined bit or flag in the GATE message. If the predetermined bit is set, then the ONU 622 must transmit a REPORT message. Therefore, if the OLT 610 wishes to only receive a REPORT message from the ONU 622, the OLT 610 can issue a GATE message specifying that the ONU 622 must transmit a REPORT message and specifying a duration of the transmission window 802 that is only long enough to transmit the REPORT message. This duration is known by the OLT 610, or can be easily computed, since the length of the REPORT message, as well as the length of the laser turn-on segment 804, synchronization segment 806, and laser turn-off segment 810, is known by the OLT 610.

Figure 9:
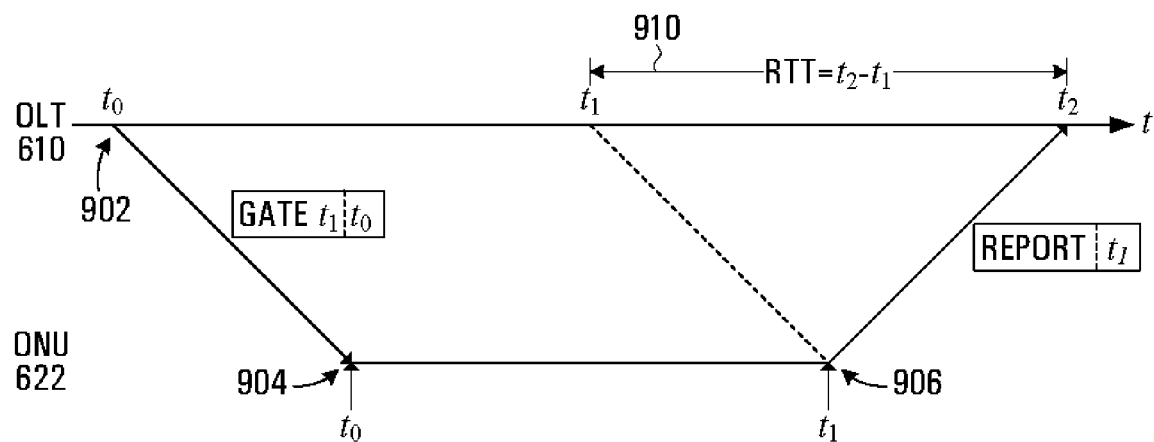
FIG. 9 illustrates a timing diagram relating to computing a round trip time.

FIG. 9 illustrates the method by which the OLT 610 maintains and updates the local clock of the ONU 622, as well as the method by which the OLT 610 can calculate the round trip time (RTT) between the OLT 610 and the ONU 622.

The OLT 610 has a free-running local clock (not shown). At time $t_0$ (indicated at 902), the OLT 610 sends a GATE message to the ONU 622. The GATE message includes (i) an indication that the ONU 622 is to send a REPORT message, (ii) the time at which the ONU 622 may begin its transmission window, $t_1$, (iii) a time stamp of the time at which the OLT 610 sent the GATE message, $t_0$, and (iv) the duration of the transmission window.

At 904, the ONU 622 receives the GATE message and updates its local clock (not shown) to time $t_0$. Thus, the local clock of ONU 622 is offset by the local clock of the OLT 610 by the downlink transmission time (i.e. the time it takes from when the GATE message leaves the OLT 610 to when it is received by the ONU 622). The ONU 622 then waits until its local clock reaches time $t_1$. When the local clock of the ONU 622 reaches time $t_1$ (indicated at 906), the ONU 622 transmits a REPORT message and includes the timestamp $t_1$ in the REPORT message. The OLT 610 receives the REPORT message at time $t_2$ (indicated at 908). The RTT is calculated as $t_2$ minus the $t_1$ value of the clock of OLT 610, as shown at 910. The same method is performed for each of the ONUs 622, 624, 626, and 628.

Thus, using the method described above, the OLT 610 is able to control, update, and maintain the clock of each of the ONUs connected to the OLT 610, and at the same time compute the RTT between the OLT 610 and each ONU. Therefore, the OLT 610 is able to schedule transmission windows to each of the ONUs that will be non-overlapping.

However, if the local clock of one of the ONUs drifts, or the ONU is failing or malfunctioning, then that ONU may begin its transmission window earlier than or later than it is supposed to (from the perspective of the OLT 610), and thereby possibly overlap with the beginning of or the end of a transmission from another ONU. If there is an overlap in data transmission between two ONUs, this is referred to as laser overlap, since the lasers of each of the two ONUs are turned on and transmitting data at the same time. Traffic collision may occur and data from one or both of the ONUs may be lost.

The REPORT message detector 658 therefore includes a laser overlap detector 670, which aims to try and detect laser overlap and identify which ONU may be causing the laser overlap. The laser overlap detector 670 is an example implementation of the more general communications interference detector 210 explained earlier with reference to FIGS. 1 to 5.

One specific example method of operation of the laser overlap detector 670 is described with reference to FIG. 10.

First, in step 1002, the laser overlap detector 670 monitors the data received from the ONUs and searches for an indication of a communications interference. For example, in some embodiments, the laser overlap detector 670 detects if there are consistent packet errors during transmissions from a particular ONU, or if an unusually large number of packet errors occur during a transmission from an ONU. If so, the laser overlap detector 670 considers this to be an indication of a communications interference. As one example, the laser overlap detector 670 may maintain a running count of how many CRC packet errors occur in one or more transmissions from a particular ONU. If the number of CRC packet errors exceeds a predetermined threshold, then a communications interference is indicated (step 1004). As another example, a higher layer function or application may inform the laser overlap detector 670 if the number of packet errors from an ONU is unusually large, consistent, or above a given threshold. If so, then the laser overlap detector 670 indicates that there is a communications interference (step 1004).

Next, in step 1006, upon detection of the communications interference, the laser overlap detector 670 selects a pair of ONUs as follows:

(1) the ONU from which the data was received having the packet errors which caused the communications interference to be detected is selected as one of the pair of ONUs, and is designated ONU 1; and (2) the ONU for which a transmission window was granted after, but adjacent to ONU 1 is selected as the other of the pair of ONUs, and is designated ONU 2.

Figure 11:
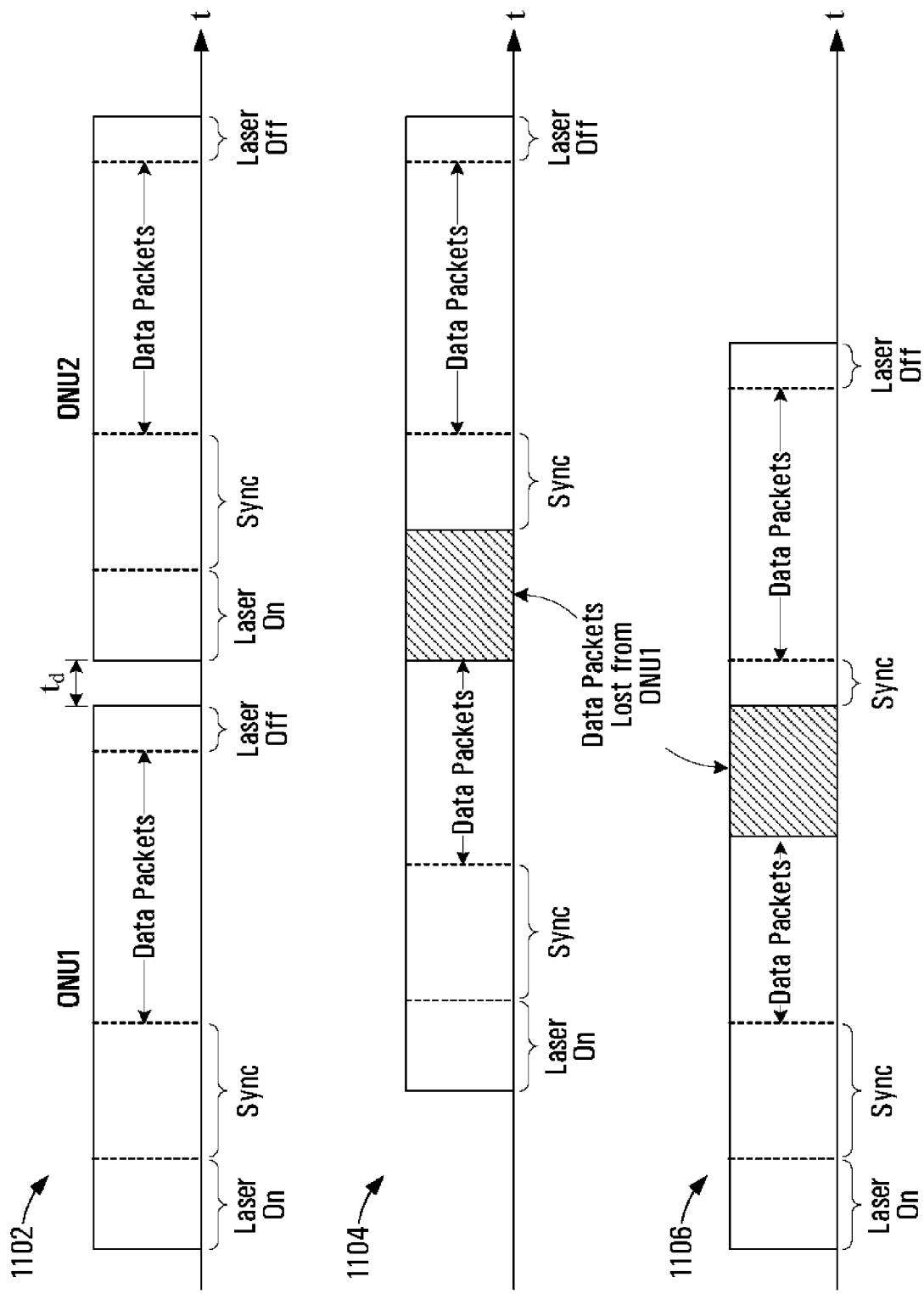
FIG. 11 illustrates overlapping transmission windows during laser overlap.

The reason this specific pair of ONUs is selected is as follows: as mentioned earlier, the laser turn-on segment and synchronization segment of a transmission window is typically substantially longer than the laser turn-off segment (e.g. as shown in FIG. 8, $t_1$ is substantially longer than $t_2$). Therefore, if data packets are in error due to laser overlap, it is likely the case that either ONU 1 turned on its laser too late (thereby causing its data packets to be corrupted because some of them are being transmitted during the laser turn-on segment and/or synchronization segment of the next transmission window) or that ONU 2 turned on its laser too early (thereby causing the data packets of ONU 1 to be corrupted because some of them are being transmitted during the laser turn-on segment and/or synchronization segment of the ONU 2's transmission window). This is illustrated in FIG. 11. Reference character 1102 illustrates the transmission windows of ONU 1 and ONU 2 during normal operation, reference character 1104 illustrates the transmission windows of ONU 1 and ONU 2 when ONU 1 is causing laser overlap, and reference character 1106 illustrates the transmission windows of ONU 1 and ONU 2 when ONU 2 is causing laser overlap. The time axis in FIG. 11 is from the perspective of the OLT 610.

In scenario 1102, the OLT 610 includes a small scheduled time gap $t_d$ between the adjacent transmission windows granted to ONU 1 and ONU 2. In scenario 1104, ONU 1 turns on its laser too late (perhaps because its local clock has drifted, or it is malfunctioning) and therefore its transmission window interferes with that granted to ONU 2, and data packets from ONU 1 are corrupted and lost. In scenario 1106, ONU 2 turns on its laser too early (perhaps because its local clock has drifted, or it is malfunctioning) and therefore its transmission window interferes with that granted to ONU 1, and data packets from ONU 1 are corrupted and lost.

Returning now to FIG. 10, next in step 1008, the laser overlap detector 670 selects another ONU different from both ONU 1 and ONU 2. The another ONU is an ONU connected to the OLT 610 that is assumed, suspected, or known to be properly operating, such that its local clock is operating properly. For example, the another ONU can be selected as an ONU for which data packets have been successfully received, indicating that this ONU is likely operating properly. In some embodiments, the another ONU can be selected by an operator.

Then, in step 1010, the laser overlap detector 670 instructs the DBA engine 652 to grant to ONU 1 a transmission window that is only long enough to transmit a REPORT message. This transmission window is illustrated as transmission window 1202 in FIG. 12, and includes the laser turn-on segment 1204, synchronization segment 1206, data transmission segment 1208, and laser turn-off segment 1210. The laser overlap detector 670 also controls the DBA engine 652 to instruct the ONU 1 that it must transmit a REPORT message during the data transmission segment 1208.

As mentioned earlier, the duration of a transmission window that is only long enough to transmit a REPORT message is known or can be easily computed by the OLT 610 since the length of the REPORT message, as well as the laser turn-on segment 1204, synchronization segment 1206, and laser turn-off segment 1210 are known by the OLT 610.

Next, in step 1012, the laser overlap detector 670 instructs the DBA engine 652 to grant to the another ONU a transmission window that is only long enough to transmit a REPORT message. This transmission window is illustrated as transmission window 1212 in FIG. 12, and includes the laser turn-on segment 1214, synchronization segment 1216, data transmission segment 1218, and laser turn-off segment 1220. The laser overlap detector 670 also controls the DBA engine 652 to instruct the another ONU that it must transmit a REPORT message during the data transmission segment 1218.

Figure 12:
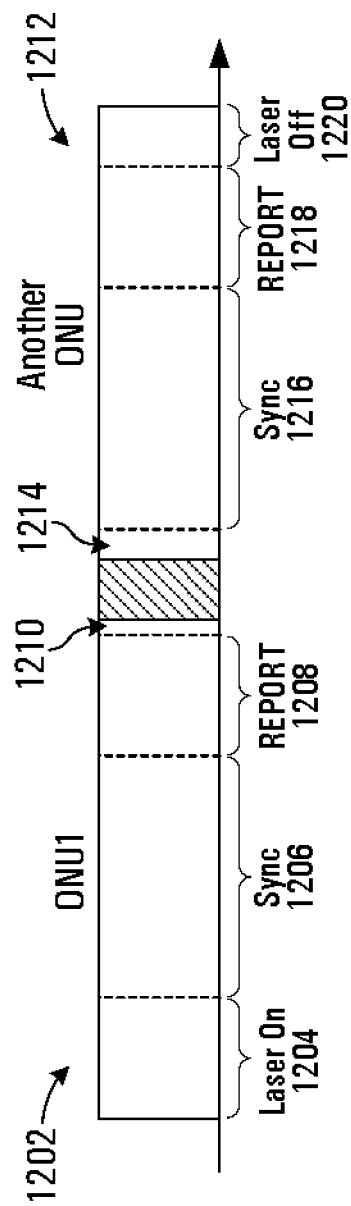
FIG. 12 illustrates two transmission windows scheduled to partially overlap.

As shown in FIG. 12, the transmission window 1212 is scheduled such that it begins later than the beginning of transmission window 1202 as scheduled and, more specifically, such that it begins later than but close to the end of the transmission of the REPORT message of the transmission window 1202. In the illustrated embodiment, the start of the transmission window 1212 is scheduled to begin immediately after the end of the REPORT message of the transmission window 1202. Although there is scheduled laser overlap between the end of the transmission window 1202 and the beginning of the transmission window 1212, the laser overlap is only scheduled to occur during the laser turn off and turn on segments 1210 and 1214, so no data is lost, assuming the ONUs start and end their transmission windows when they are scheduled to.

A benefit of scheduling the transmission window 1212 to begin immediately after the transmission of the REPORT message of the transmission window 1202 is that even a slight laser overlap can be detected. For example, even if ONU 1 starts its transmission window only slightly too late, then the REPORT message transmitted by ONU 1 in transmission window 1202 will be corrupted, indicating the laser overlap.

In other embodiments, the transmission window 1212 is scheduled to begin later, for example, after the end of the transmission window 1202 so that there is no scheduled overlap. It will be appreciated that the later the transmission window 1212 is scheduled to begin after the data transmission period 1208 during which the REPORT message of ONU 1 is transmitted, the greater the amount of laser overlap that must occur before it is detected through loss of the REPORT message of ONU 1.

It will be noted that FIG. 12 illustrates the scheduling of the transmission windows 1202 and 1212 from the perspective of the OLT 610. The actual time at which the transmission windows are transmitted depends on the ONUs and will only be the same if ONU 1 and the another ONU are operating correctly and their local clocks are properly offset from the OLT 610 in the manner illustrated earlier with reference to FIG. 9.

Returning back to FIG. 10, next in step 1014, a copy of the grant of transmission window 1202 to ONU 1 is stored in the grant buffer 668, and the laser overlap detector 670 uses the grant to determine an expected window during which the REPORT message from ONU 1 is expected to be received. This expected window is estimated based on the information in the grant and the RTT between the OLT 610 and the ONU 1. Notably, the grant specifies the scheduled start of the transmission window 1202, and since the length of a REPORT message and the duration of the laser turn-on segment 1204, synchronization segment 1206, and laser turn-off segment 1208 are known, the laser overlap detector 670 can compute with accuracy when the REPORT message should be transmitted. The expected arrival time of the REPORT message from ONU 1 is the expected transmission time of the REPORT message plus the RTT. The expected window of arrival is then chosen as the expected arrival time plus a generous margin on each side.

Next, in step 1016, the laser overlap detector 670 determines whether the REPORT message from ONU 1 is received within the expected window of arrival computed in step 914. If not, then ONU 1 is indicated as possibly causing laser overlap (step 1018). If so, then ONU 2 is indicated as possibly causing laser overlap (step 1020).

In steps 1010 to 1016, the ONU 2 is replaced with the another ONU, which is suspected, assumed, or known to be operating properly. By such a replacement, if the REPORT message of ONU 1 is missed in step 1016, then it is an indication that ONU 1 may be causing the problem, since the laser overlap appears to still be occurring even though ONU 2 has been replaced with another ONU that is suspected, assumed, or known to be operating properly. On the other hand, if the REPORT message of ONU 1 is received, then it is an indication that ONU 2 may be causing the problem, since the laser overlap appears to have disappeared with the replacement of ONU 2 with the another ONU that is suspected, assumed, or known to be operating properly.

Figure 13:
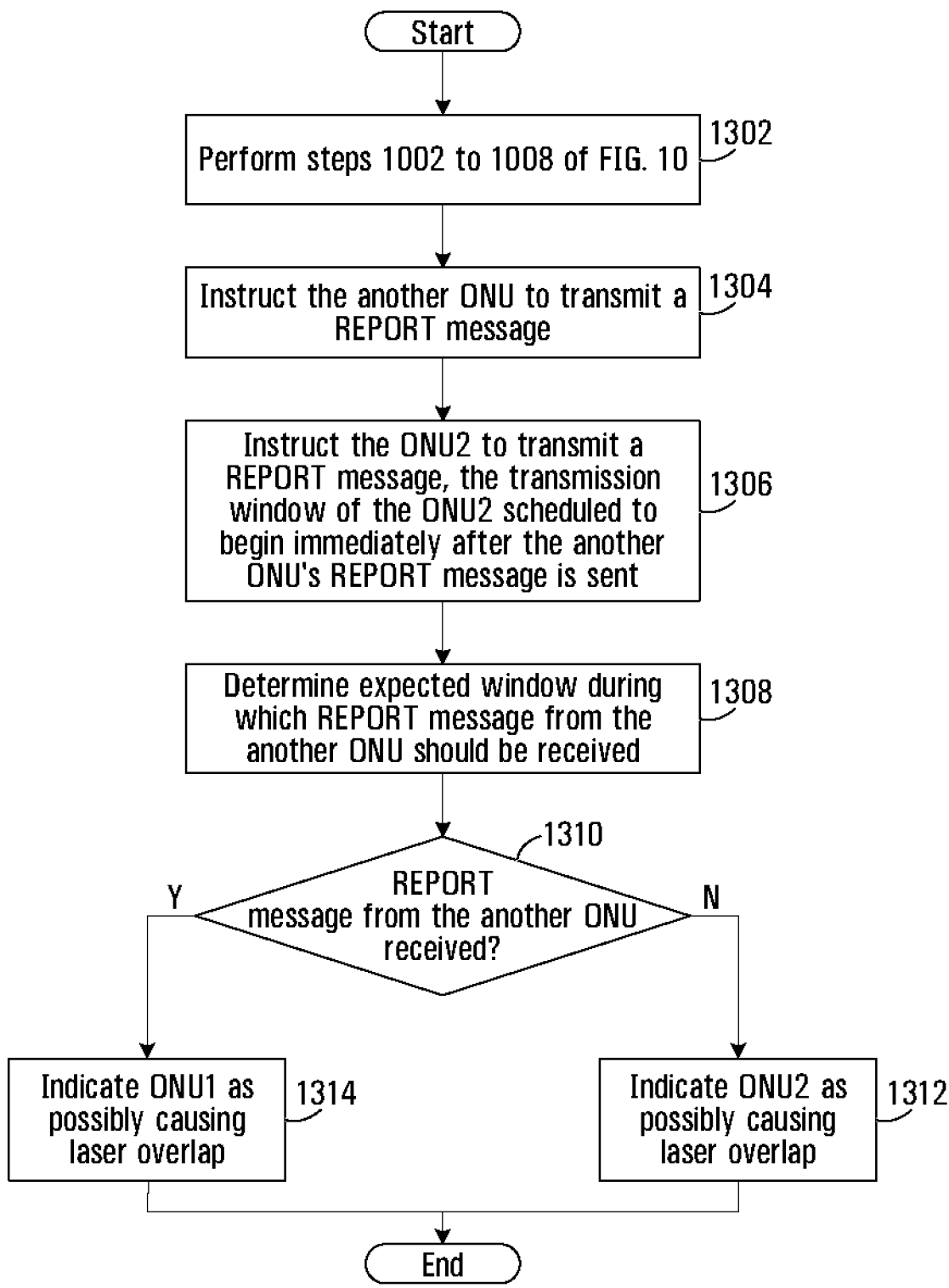
FIG. 13 is a flow chart of another embodiment of a method of determining an ONU that may be causing laser overlap.

An alternative example method of operation of the laser overlap detector 670 is described with reference to FIG. 13.

Figure 10:
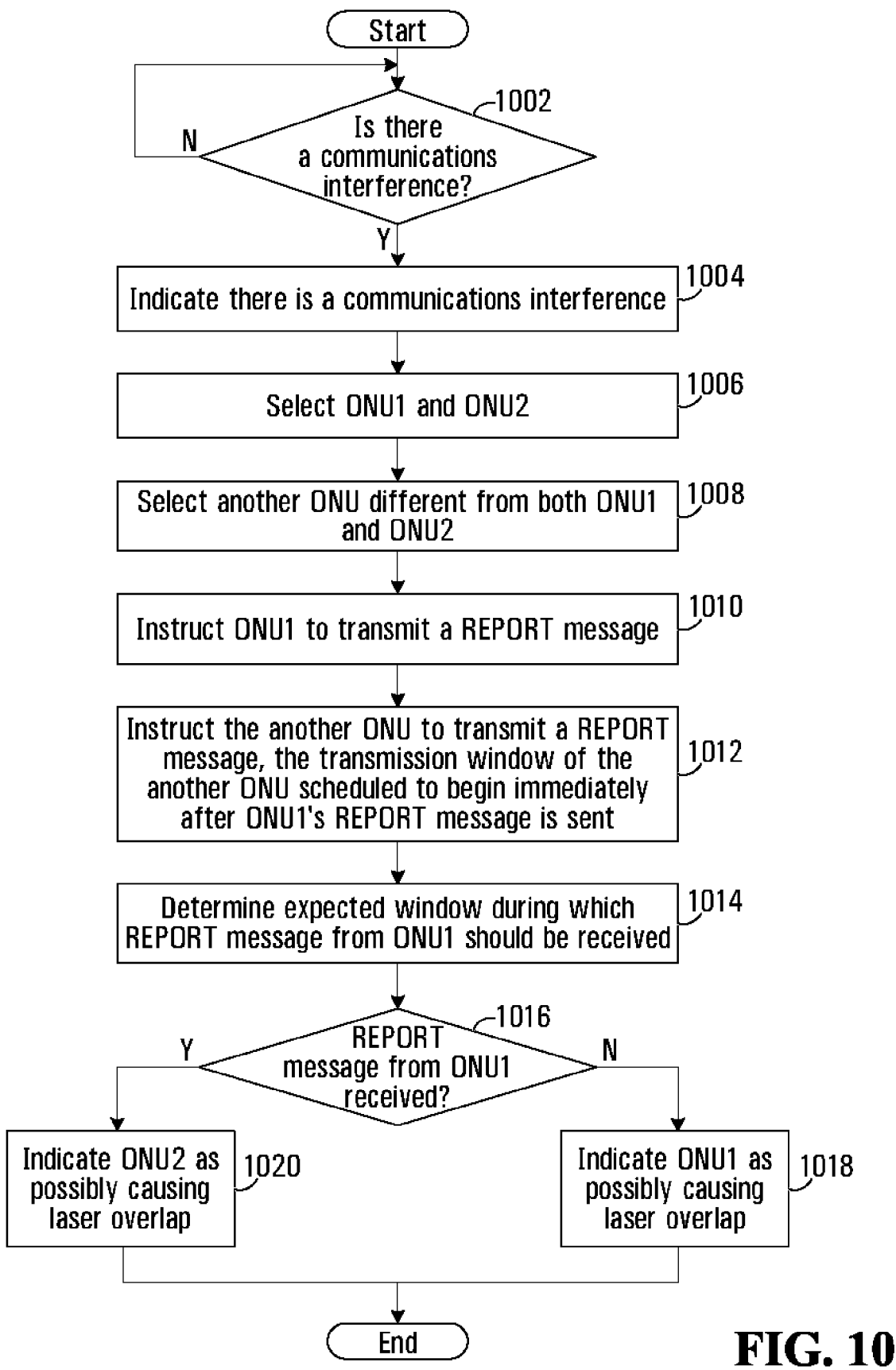
FIG. 10 is a flow chart of an embodiment of a method of determining an ONU that may be causing laser overlap.

First in step 1302, steps 1002 to 1008 of FIG. 10 are performed. Then, in step 1304, the laser overlap detector 670 instructs the DBA engine 652 to grant to the another ONU a transmission window that is only long enough to transmit a REPORT message. This transmission window is illustrated as transmission window 1402 in FIG. 14, and includes the laser turn-on segment 1404, synchronization segment 1406, data transmission segment 1408, and laser turn-off segment 1410. The laser overlap detector 670 also controls the DBA engine 652 to instruct the another ONU that it must transmit a REPORT message during the data transmission segment 1408.

Next, in step 1306, the laser overlap detector 670 instructs the DBA engine 652 to grant to ONU 2 a transmission window that is only long enough to transmit a REPORT message. This transmission window is illustrated as transmission window 1412 in FIG. 13, and includes the laser turn-on segment 1414, synchronization segment 1416, data transmission segment 1418, and laser turn-off segment 1420. The laser overlap detector 670 also controls the DBA engine 652 to instruct the ONU 2 that it must transmit a REPORT message during the data transmission segment 1418.

Figure 14:
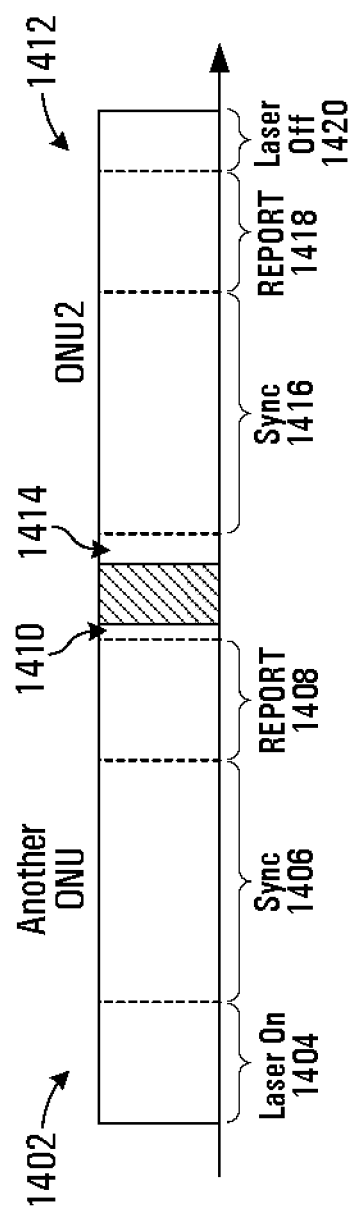
FIG. 14 illustrates another two transmission windows scheduled to partially overlap.

As shown in FIG. 14, the transmission window 1412 is scheduled such that it begins later than the beginning of transmission window 1402 as scheduled and, more specifically, such that it begins later than but close to the end of the transmission of the REPORT message of the transmission window 1402. In the illustrated embodiment, the start of the transmission window 1412 is scheduled to begin immediately after the end of the REPORT message of the transmission window 1402. Although there is scheduled laser overlap between the end of the transmission window 1402 and the beginning of the transmission window 1412, the laser overlap is only scheduled to occur during the laser turn off and turn on segments 1410 and 1414, so no data is lost, assuming the ONUs start and end their transmission windows when they are scheduled to.

A benefit of scheduling the transmission window 1412 to begin immediately after the transmission of the REPORT message of the transmission window 1402 is that even a slight laser overlap can be detected. For example, even if ONU 2 starts its transmission window only slightly too early, then the REPORT message transmitted by the another ONU in transmission window 1402 will be corrupted, indicating the laser overlap.

In other embodiments, the transmission window 1412 is scheduled to begin later, for example, after the end of the transmission window 1402 so that there is no scheduled overlap. It will be appreciated that the later the transmission window 1412 is scheduled to begin after the data transmission period 1408 during which the REPORT message of the another ONU is transmitted, the greater the amount of laser overlap that must occur before it is detected through loss of the REPORT message of the another ONU.

As with FIG. 12, it will be noted that FIG. 14 illustrates the scheduling of the transmission windows 1402 and 1412 from the perspective of the OLT 610. The actual time at which the transmission windows are transmitted depends on the ONUs and will only be the same if the another ONU and ONU 2 are operating correctly and their local clocks are properly offset from the OLT 610 in the manner illustrated earlier with reference to FIG. 9.

Returning back to FIG. 13, next in step 1308, a copy of the grant of the transmission window 1402 to the another ONU is stored in the grant buffer 668, and the laser overlap detector 670 uses the grant to determine an expected window during which the REPORT message from the another ONU is expected to be received. As with step 1014 of FIG. 10, this expected window is estimated based on the information in the grant and the round trip time between the OLT 610 and the ONU.

Next, in step 1310, the laser overlap detector 670 determines whether the REPORT message from the another ONU is received within the expected window of arrival computed in step 1308. If not, then ONU 2 is indicated as possibly causing laser overlap (step 1312). If so, then ONU 1 is indicated as possibly causing laser overlap (step 1314).

In steps 1304 to 1310, the ONU 1 is replaced with the another ONU, which is suspected, assumed, or known to be operating properly. By such a replacement, if the REPORT message of the another ONU is missed in step 1310, then it is an indication that ONU 2 may be causing the problem, since the laser overlap appears to still be occurring even though ONU 1 has been replaced with another ONU that is suspected, assumed, or known to be operating properly. On the other hand, if the REPORT message of the another ONU is received, then it is an indication that ONU 1 may be causing the problem, since the laser overlap appears to have disappeared with the replacement of ONU 1 with the another ONU that is suspected, assumed, or known to be operating properly.

Figure 15:
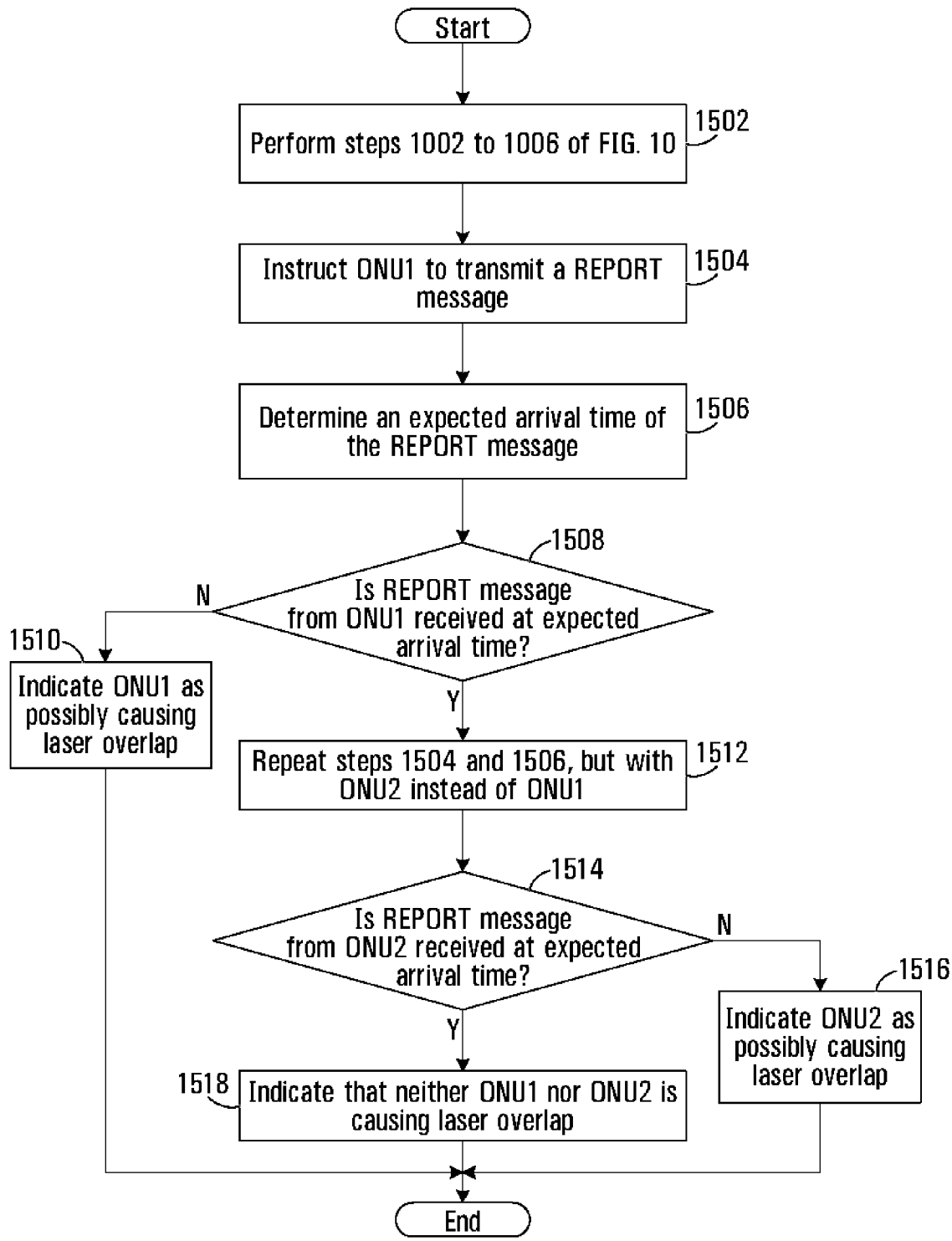
FIG. 15 is a flow chart of another embodiment of a method of determining an ONU that may be causing laser overlap.

Yet another alternative example method of operation of the laser overlap detector 670 is described with reference to FIG. 15.

First, in step 1502, steps 1002 to 1006 of FIG. 10 are performed. Then, in step 1504, the laser overlap detector 670 instructs the DBA engine 652 to grant to ONU 1 a transmission window that is only long enough to transmit a REPORT message.

Next, in step 1506, a copy of the grant of the transmission window to ONU 1 is stored in the grant buffer 668, and the laser overlap detector 670 uses the grant to determine an expected arrival time of the REPORT message. This expected arrival time is computed based on the information in the grant and the RTT between the OLT 610 and the ONU 1. Notably, the grant specifies the scheduled start of the transmission window, and since the length of a REPORT message and the duration of the laser turn-on segment, synchronization segment, and laser turn-off segment are known, the laser overlap detector 670 can compute with accuracy when the REPORT message should be transmitted. The expected arrival time of the REPORT message from ONU 1 is the expected transmission time of the REPORT message plus the RTT.

Next, in step 1508, the laser overlap detector 670 determines whether the REPORT message from ONU 1 is received at the expected arrival time. If not, then ONU 1 is indicated as possibly causing laser overlap (step 1510), and the method ends. Otherwise, if so, then the method proceeds to step 1512, in which steps 1504 and 1506 are repeated with ONU 2.

In step 1514, the laser overlap detector 670 determines whether the REPORT message from ONU 2 is received at the expected arrival time. If not, then ONU 2 is indicated as possibly causing laser overlap (step 1516), and the method ends. Otherwise, neither ONU 1 nor ONU 2 is indicated as possibly causing laser overlap (step 1518), and the method ends.

In other embodiments, during steps 1508 and 1514 the ONU is only indicated as possibly causing laser overlap if the arrival time of the REPORT message deviates from the expected arrival time by more than a predetermined margin. The predetermined margin is implementation specific and captures small variations that may cause a REPORT message transmitted from the ONU at the correct time (from the perspective of the OLT 610) to arrive slightly later or earlier than expected. For example, such a variation may occur due to slight variations in the RTT. In some embodiments, if the REPORT message arrives later than its expected arrival time by more than the predetermined margin, then the ONU is indicated as possibly causing laser overlap by turning on its laser too late, and if the REPORT message arrives earlier than its expected arrival time by more than the predetermined margin, then the ONU is indicated as possibly causing laser overlap by turning on its laser too early.

Thus, by performing the method of any one of FIGS. 10 to 15, the laser overlap detector 670 aims to detect a communications interference and indicate which ONU may be causing the communications interference due to laser overlap.

Figure 16:
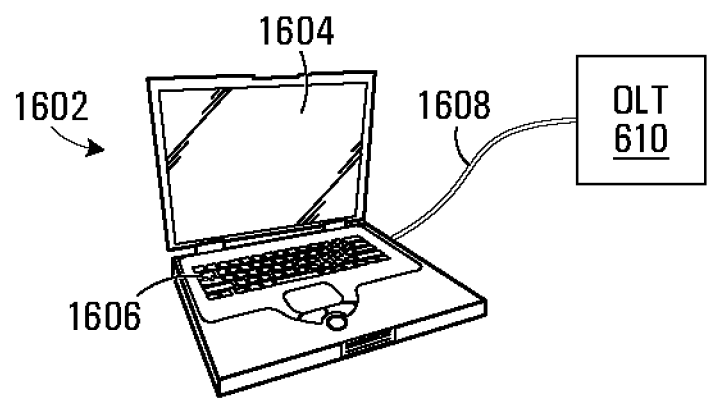
FIG. 16 illustrates an embodiment of a system for investigating whether an ONU may be causing laser overlap.

FIG. 16 illustrates a system that allows an operator or user to investigate whether a particular ONU is causing laser overlap. As shown in FIG. 16, the system includes a computer 1602 having a graphical display 1604 and a user input, such as a keyboard 1606. The keyboard 1606 is only one example of a user input. Other types of user inputs may be used in addition or instead, such as a mouse or a touch screen.

The computer 1602 is communicatively connected to the OLT 610, for example, via a cable 1608. The computer 1602 is therefore able to receive information from the OLT 610 relating to the PON and display this to the user on the display 1604. For example, the display 1604 may indicate which ONUs (e.g. ONUs 622, 624, 626, and 628) are registered with the OLT 610.

In one embodiment, upon detection of a communications interference by the laser overlap detector 670 in step 1004, the user is informed on the display 1604. The computer 1602 may then enquire with the user (via the display 1604) whether the user would like to investigate whether an ONU is causing laser overlap. If the user indicates 'yes' via the user input 1606, then the computer 1602 sends a message to the OLT 610 instructing the laser overlap detector 670 to perform the remaining steps in FIG. 10. The ONU indicated as possibly causing laser overlap in steps 1018/1020 is displayed to the user on display 1604.

The user can then use the computer 1602 to perform further investigations to increase the user's certainty that the ONU indicated as possibly causing laser overlap is indeed causing laser overlap. For example, the user can control the computer 1602 via the keyboard 1606 to send a message to the OLT 610 instructing the laser overlap detector 670 to either repeat the method of FIG. 10, or instead or additionally perform the methods of FIG. 13 and/or FIG. 15. If upon multiple executions of one or more of the methods of FIGS. 10, 13, and/or 15 the same ONU is consistently indicated as possibly causing laser overlap, this provides increased certainty that the identified ONU is indeed causing laser overlap. The user can then instruct the computer 1602 (via user input 1606) to remedy the problem, for example by:

(1) sending a message to the OLT 610 instructing the OLT 610 to deregister the ONU causing laser overlap; or (2) sending a message to the OLT 610 instructing the OLT 610 to modify the duration of the transmission window granted to the ONU causing laser overlap. For example, from the investigations, the user may be able to determine that the ONU causing laser overlap is turning on its laser too early, in which case the transmission window granted to the ONU can be modified to begin later. Or more generally, the duration of time between the end of the adjacent earlier transmission window and the start of the transmission window granted to the problem ONU can be increased. As another example, from the investigations, the user may be able to determine that the ONU causing laser overlap is turning off its laser too late, in which case the transmission window granted to the ONU can be modified to end earlier. Or more generally, the duration of time between the end of the transmission window granted to the problem ONU and the start of the next adjacent transmission window can be increased.

In some embodiments, the display 1604 may indicate which ONUs are registered, perhaps even with information indicating the location of the ONUs (e.g. illustrated on a map). The display 1604 may indicate which registered ONUs are known or assumed to be working properly and which ONUs are suspected of causing laser overlap.

In some embodiments, the computer 1602 may be portable. For example, in some embodiments the computer 1602 may be a handheld device that communicates wirelessly with the OLT 610. A benefit of such embodiments is that the user or operator can use the computer 1602 to perform testing in the field.

In some embodiments, a user may be able to select an ONU via the user input 1606 and request that the selected ONU be tested to determine if it is causing laser overlap. Upon request, the computer 1602 controls the OLT 610 to perform one of the methods described earlier, for example, steps 1504 to 1510 of FIG. 15, but using the selected ONU in place of ONU 1. In this way, a user can test specific ONUs, for example, during maintenance, after installation or registration of ONUs, or upon an indication of a communications interference.

The embodiments described above with reference to FIGS. 6 to 16 illustrate example implementations in the specific context of an Ethernet Passive Optical Network (EPON). However, as is clear from FIGS. 1 to 5 and its related description, the methods provided herein are not limited to these example implementations. More general methods and systems not limited to the specific implementations described with reference to FIGS. 6 to 16 are summarized below.

In one embodiment, there is provided a method comprising: in respect of a pair of ONUs comprising a first ONU and a second ONU: (1) granting to the first ONU a first time window for transmitting a first message from the first ONU to the OLT; (2) granting to another ONU different from both the first ONU and the second ONU a second time window for transmitting a second message from the another ONU to the OLT, the second time window scheduled, from the perspective of the OLT, to begin at a select time later than the beginning of the first time window; (3) if the first message is not received by the OLT, then indicating that the first ONU may be causing communications interference.

In another embodiment, there is provided a method comprising: in respect of a pair of ONUs comprising a first ONU and a second ONU: (1) granting to another ONU different from both the first ONU and the second ONU a first time window for transmitting a first message from the another ONU to the OLT; (2) granting to the second ONU a second time window for transmitting a second message from the second ONU to the OLT, the second time window scheduled, from the perspective of the OLT, to begin at a select time later than the beginning of the first time window; (3) if the first message is not received by the OLT, then indicating that the second ONU may be causing communications interference.

In another embodiment, at least one of the two methods above is performed. In yet another embodiment, the first method above is performed, and if the first ONU is not indicated as possibly causing communications interference, then either the second method is performed or the second ONU is indicated as possibly causing communications interference.

In another embodiment, there is provided a method comprising: (a) granting to an ONU a time window for transmitting a message from the ONU to the OLT; (b) if the message is not received by the OLT during an expected window of arrival, then indicating that the ONU may be causing communications interference.

In another embodiment, there is provided a computer-implemented method comprising: (1) sending a message to an OLT instructing the OLT to perform any of the methods described in the four paragraphs above; (2) receiving from the OLT an indication of whether or not the message expected to be received by the OLT is received by the OLT, and if not, which ONU is possibly causing the communications interference; and (3) if the message expected to be received is not received by the OLT, then indicating the ONU possibly causing communications interference. In an alternative variation of this method, the computer only receives from the OLT the indication of whether or not the message expected to be received by the OLT is received, and if the message is not received the computer determines based on this information which ONU is possibly causing laser overlap.

In another embodiment, there is provided a method comprising: in response to an indication that an ONU either is causing communications interference or may be causing communications interference, modifying at least one of: (i) a duration of a transmission window granted to the ONU; (ii) a duration of time between an end of an earlier and adjacent transmission window granted to another ONU and a start of a transmission window granted to the ONU; and (iii) a duration of time between an end of a transmission window granted to the ONU and a start of a later and adjacent transmission window granted to another ONU.

In another embodiment, there is provided a system for performing any of the methods described above, as well as a computer readable medium having stored thereon code that, when executed, causes a computing device to perform any of the methods described above.

In another embodiment, there is provided a system comprising: a computer having a graphical display for representing at least a portion of a network, the network including an OLT, a pair of ONUs comprising a first ONU and a second ONU, and another ONU different from both the first ONU and the second ONU. The system further comprises a communications interface communicatively connecting the computer to the OLT, thereby allowing the computer to instruct the OLT to performing at least one of (a) and (b). (a) comprises granting to the first ONU a first time window for transmitting a first message from the first ONU to the OLT, and granting to the another ONU a second time window for transmitting a second message from the another ONU to the OLT, the second time window scheduled, from the perspective of the OLT, to begin at a select time later than the beginning of the first time window. (b) comprises: granting to another ONU different from both the first ONU and the second ONU a third time window for transmitting a third message from the another ONU to the OLT, and granting to the second ONU a fourth time window for transmitting a fourth message from the second ONU to the OLT, the fourth time window scheduled, from the perspective of the OLT, to begin at a select time later than the beginning of the third time window. The graphical display further for displaying (i) that the first ONU is causing communications interference if (a) is performed and the first message is not received by the OLT, and (ii) that the second ONU is causing communications interference if (b) is performed and the third message is not received by the OLT.

Although the foregoing has been described with reference to certain specific embodiments, various modifications thereof will be apparent to those skilled in the art without departing from the scope of the claims appended hereto.

The invention claimed is:

1. A method in an Optical Line Terminal (OLT), the method comprising:
    granting to a pair of Optical Network Units (ONUs) a respective time window for transmitting data to the OLT, the pair of ONUs comprising a first ONU and a second ONU, and the time window granted to the second ONU scheduled, from the perspective of the OLT, adjacent to and later than the time window granted to the first ONU;
    receiving data from the first ONU that contains packet errors;
    if subsequent to said granting, one or both of the pair of ONUs is either suspected by the OLT of causing communications interference due to the packet errors, known by the OLT to be causing communications interference due to the packet errors, or is assumed by the OLT to be causing communications interference due to the packet errors, then subsequent to said granting performing (a) or (b) or both (a) and (b);
    wherein (a) comprises:
        granting to the first ONU a first time window for transmitting a first message from the first ONU to the OLT, and granting to another ONU different from both the first ONU and the second ONU a second time window for transmitting a second message from the another ONU to the OLT, the second time window scheduled, from the perspective of the OLT, to begin at a select time later than the beginning of the first time window for the purpose of enabling communications interference detection;
        if the first message is not received by the OLT, then indicating that the first ONU may be causing communications interference, and otherwise if the first message is received by the OLT then indicating that the second ONU may be causing communications interference;
    and wherein (b) comprises:
        granting to another ONU different from both the first ONU and the second ONU a third time window for transmitting a third message from the another ONU to the OLT, and granting to the second ONU a fourth time window for transmitting a fourth message from the second ONU to the OLT, the fourth time window scheduled, from the perspective of the OLT, to begin at a select time later than the beginning of the third time window for the purpose of enabling communications interference detection;
        if the third message is not received by the OLT, then indicating that the second ONU may be causing communications interference, and otherwise if the third message is received by the OLT then indicating that the first ONU may be causing communications interference.

2. The method of claim 1 wherein:
when performing (a), the second time window is scheduled, from the perspective of the OLT, to begin adjacent to or partially overlapping the first time window and later than the scheduled transmission of the first message;
when performing (b), the fourth time window is scheduled, from the perspective of the OLT, to begin adjacent to or partially overlapping the third time window and later than the scheduled transmission of the third message.

3. The method of claim 2 wherein:
when performing (a), the second time window is scheduled, from the perspective of the OLT, to begin immediately after the scheduled transmission of the first message;
when performing (b), the fourth time window is scheduled, from the perspective of the OLT, to begin immediately after the scheduled transmission of the third message.

4. The method of claim 1 wherein the another ONU that is different from both the first ONU and the second ONU is either not suspected by the OLT of causing laser overlap, known by the OLT not to cause laser overlap, or is assumed by the OLT not to cause laser overlap.

5. The method of claim 1 wherein at least one of: (i) the first message and the second message are both REPORT messages; and (ii) the third message and the fourth message are both REPORT messages.

6. The method of claim 2 wherein:
(i) when performing (a), the first time window includes a laser turn-on segment, a data transmission segment, and a laser turn-off segment, and the second time window is scheduled, from the perspective of the OLT, to begin during the first time window, but no earlier than the start of the laser turn-off segment;
(ii) when performing (b), the third time window includes another laser turn-on segment, another data transmission segment, and another laser turn-off segment, and the fourth time window is scheduled, from the perspective of the OLT, to begin during the third time window, but no earlier than the start of the another laser turn-off segment.

7. The method of claim 1 wherein:
(i) when performing (a), the first message is not considered to be received by the OLT if it is not received within an expected window of arrival determined by the OLT;
(ii) when performing (b), the third message is not considered to be received by the OLT if it is not received within another expected window of arrival determined by the OLT.

8. The method of claim 1 further comprising the OLT either:
causing deregistration of an ONU suspected of causing communications interference; or performing at least one of: (i) reducing a duration of a transmission window granted to the ONU suspected of causing communications interference; (ii) increasing a duration of time between an end of an earlier and adjacent transmission window granted to another ONU and a start of a transmission window granted to the ONU suspected of causing communications interference; and
(iii) increasing a duration of time between an end of a transmission window granted to the ONU suspected of causing communications interference and a start of a later and adjacent transmission window granted to another ONU.

9. The method of claim 1 wherein:
(i) when performing (a), the first message is transmitted immediately before the first ONU turns off its laser;
(ii) when performing (b), the third message is transmitted immediately before the another ONU turns off its laser.

10. The method of claim 1 wherein:
when performing (a), said indicating that the first ONU may be causing communications interference comprises indicating that the first ONU may be causing laser overlap;
when performing (b), said indicating that the second ONU may be causing communications interference comprises indicating that the second ONU may be causing laser overlap.

11. A system comprising:
a computer having a graphical display for representing at least a portion of a network, the network including an Optical Line Terminal (OLT), a pair of Optical Network Units (ONUs) comprising a first ONU and a second ONU, and another ONU different from both the first ONU and the second ONU; the OLT being configured to grant to the pair of ONUs a respective time window for transmitting data to the OLT, the time window granted to the second ONU scheduled, from the perspective of the OLT, adjacent to and later than the time window granted to the first ONU; the OLT further configured to receive data from the first ONU that contains packet errors;
a communication interface for communicatively connecting the computer to the OLT;
if subsequent to the OLT granting the pair of ONUs the respective time window, one or both of the pair of ONUs is either suspected by the OLT of causing communications interference due to the packet errors, known by the OLT to be causing communications interference due to the packet errors, or is assumed by the OLT to be causing communications interference due to the packet errors, then subsequent to the OLT granting the pair of ONUs the respective time window, the computer configured to instruct the OLT to perform (a) or (b) or both (a) and (b);
wherein (a) comprises: granting to the first ONU a first time window for transmitting a first message from the first ONU to the OLT, and granting to the another ONU a second time window for transmitting a second message from the another ONU to the OLT, the second time window scheduled, from the perspective of the OLT, to begin at a select time later than the beginning of the first time window for the purpose of enabling communications interference detection; and
wherein (b) comprises: granting to the another ONU a third time window for transmitting a third message from the another ONU to the OLT, and granting to the second ONU a fourth time window for transmitting a fourth message from the second ONU to the OLT, the fourth time window scheduled, from the perspective of the OLT, to begin at a select time later than the beginning of the third time window for the purpose of enabling communications interference detection;
the graphical display further for displaying: (i) that the first ONU either is or may be causing communications interference if (a) is performed and the first message is not received by the OLT, and otherwise that the second ONU is or may be causing communications interference if (a) is performed and the first message is received by the OLT; and (ii) that the second ONU either is or may be causing communications interference if (b) is performed and the third message is not received by the OLT, and otherwise that the first ONU is or may be causing communications interference if (b) is performed and the third message is received by the OLT.

12. An Optical Line Terminal (OLT) comprising:
an optical transceiver for communicating with (i) a pair of Optical Network Units (ONUs) comprising a first ONU and a second ONU, (ii) and another ONU different from both the first ONU and the second ONU;
a grant scheduler for granting time windows for transmitting messages to the OLT, the grant scheduler for granting to the pair of ONUs a respective time window, the time window granted to the second ONU scheduled, from the perspective of the OLT, adjacent to and later than the time window granted to the first ONU;
the optical transceiver for receiving data from the first ONU that contains packet errors;
a communications interference detector for controlling the OLT to perform:
if subsequent to said granting, one or both of the pair of ONUs is either suspected by the OLT of causing communications interference due to the packet errors, known by the OLT to be causing communications interference due to the packet errors, or is assumed by the OLT to be causing communications interference due to the packet errors, then subsequent to said granting performing (a) or (b) or both (a) and (b);
wherein (a) comprises:
the grant scheduler granting to the first ONU a first time window for transmitting a first message from the first ONU to the OLT, and the grant scheduler granting to the another ONU a second time window for transmitting a second message from the another ONU to the OLT, the second time window scheduled, from the perspective of the OLT, to begin at a select time later than the beginning of the first time window for the purpose of enabling communications interference detection;
if the first message is not received by the OLT, then indicating that the first ONU may be causing communications interference, and otherwise if the first message is received by the OLT then indicating that the second ONU may be causing communications interference;
and wherein (b) comprises:
the grant scheduler granting to the another ONU a third time window for transmitting a third message from the another ONU to the OLT, and the grant scheduler granting to the second ONU a fourth time window for transmitting a fourth message from the second ONU to the OLT, the fourth time window scheduled, from the perspective of the OLT, to begin at a select time later than the beginning of the third time window for the purpose of enabling communications interference detection;
if the third message is not received by the OLT, then indicating that the second ONU may be causing communications interference, and otherwise if the third message is received by the OLT then indicating that the first ONU may be causing communications interference.

13. The OLT of claim 12 wherein the another ONU is either not suspected by the OLT of causing laser overlap, known by the OLT not to cause laser overlap, or is assumed by the OLT not to cause laser overlap.

14. The OLT of claim 12 wherein:
when performing (a), the second time window is scheduled, from the perspective of the OLT, to begin adjacent to or partially overlapping the first time window and later than the scheduled transmission of the first message;
when performing (b), the fourth time window is scheduled, from the perspective of the OLT, to begin adjacent to or partially overlapping the third time window and later than the scheduled transmission of the third message.

15. The OLT of claim 12 wherein:
when performing (a), said indicating that the first ONU may be causing communications interference comprises indicating that the first ONU may be causing laser overlap;
when performing (b), said indicating that the second ONU may be causing communications interference comprises indicating that the second ONU may be causing laser overlap.

16. A non-transitory computer readable medium having stored thereon computer readable instructions for execution in one or more processing devices in an Optical Line Terminal (OLT); the computer readable instructions comprising:
code for granting to a pair of Optical Network Units (ONUs) a respective time window for transmitting data to the OLT, the pair of ONUs comprising a first ONU and a second ONU, and the time window granted to the second ONU scheduled, from the perspective of the OLT, adjacent to and later than the time window granted to the first ONU;
receiving data from the first ONU that contains packet errors;
code for performing (a) or (b) or both (a) and (b), subsequent to said granting, if subsequent to said granting one or both of the pair of ONUs is either suspected by the OLT of causing communications interference due to the packet errors, known by the OLT to be causing communications interference due to the packet errors, or is assumed by the OLT to be causing communications interference due to the packet errors;
wherein (a) comprises:
granting to the first ONU a first time window for transmitting a first message from the first ONU to the OLT, and granting to another ONU different from both the first ONU and the second ONU a second time window for transmitting a second message from the another ONU to the OLT, the second time window scheduled, from the perspective of the OLT, to begin at a select time later than the beginning of the first time window for the purpose of enabling communications interference detection;
if the first message is not received by the OLT, then indicating that the first ONU may be causing communications interference, and otherwise if the first message is received by the OLT then indicating that the second ONU may be causing communications interference;
and wherein (b) comprises:
granting to another ONU different from both the first ONU and the second ONU a third time window for transmitting a third message from the another ONU to the OLT, and granting to the second ONU a fourth time window for transmitting a fourth message from the second ONU to the OLT, the fourth time window scheduled, from the perspective of the OLT, to begin at a select time later than the beginning of the third time window for the purpose of enabling communications interference detection;
if the third message is not received by the OLT, then indicating that the second ONU may be causing communications interference, and otherwise if the third message is received by the OLT then indicating that the first ONU may be causing communications interference.

17. The non-transitory computer readable medium of claim 16 wherein the non-transitory computer readable medium comprises a magnetic cassette or a magnetic tape or magnetic disk storage or an optical disk or a CD-ROM or a DVD or volatile storage memory or non-volatile storage memory or RAM or ROM or EEPROM or flash memory.

* * * * *